(12) United States Patent
Li et al.

(10) Patent No.: US 12,010,519 B2
(45) Date of Patent: Jun. 11, 2024

(54) INFORMATION SHARING METHOD, TERMINAL DEVICE, STORAGE MEDIUM, AND COMPUTER PROGRAM PRODUCT

(71) Applicant: HUAWEI TECHNOLOGIES CO., LTD., Shenzhen (CN)

(72) Inventors: Fusheng Li, Shenzhen (CN); Deyong Li, Shenzhen (CN); Yingchao Wang, Shenzhen (CN); Juan Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/665,779

(22) Filed: Feb. 7, 2022

(65) Prior Publication Data

US 2022/0159471 A1 May 19, 2022

Related U.S. Application Data

(63) Continuation of application No. PCT/CN2020/105143, filed on Jul. 28, 2020.

(30) Foreign Application Priority Data

Aug. 9, 2019 (CN) .......................... 201910735944.6

(51) Int. Cl.
*H04W 12/50* (2021.01)
*H04W 12/041* (2021.01)
(Continued)

(52) U.S. Cl.
CPC ......... *H04W 12/50* (2021.01); *H04W 12/041* (2021.01); *H04W 12/0471* (2021.01); *H04W 12/068* (2021.01); *H04W 12/69* (2021.01)

(58) Field of Classification Search
CPC ............... H04W 12/50; H04W 12/041; H04W 12/0471; H04W 12/068; H04W 12/69;
(Continued)

(56) References Cited

U.S. PATENT DOCUMENTS 8,811,892 B2 * 8/2014 Khan ...................... H04W 4/80
455/406
8,844,012 B1 * 9/2014 Chan ..................... H04W 12/06
709/225
(Continued)

FOREIGN PATENT DOCUMENTS

CN 104104414 A 10/2014
CN 104219055 A 12/2014
(Continued)

*Primary Examiner* — Harunur Rashid
(74) *Attorney, Agent, or Firm* — Rimon PC

(57) ABSTRACT

An information sharing method and related terminal device are provided. In the method, a first terminal device first establishes a communication connection to a second terminal device. When the first terminal device approaches a third terminal device, the first terminal device performs identity authentication on the third terminal device through near field communication (NFC). After determining that the identity of the third terminal device is valid, the first terminal device sends communication link information to the third terminal device by using a short-range wireless communication technology. After receiving the communication link information, the third terminal device establishes a communication connection to the second terminal device by using the communication link information when detecting the second terminal device. In the foregoing solution, communication connections can be quickly and conveniently established, and information sharing can be implemented among a group of terminal devices.

18 Claims, 11 Drawing Sheets

(51) Int. Cl.
*H04W 12/0471* (2021.01)
*H04W 12/06* (2021.01)
*H04W 12/69* (2021.01)

(58) Field of Classification Search
CPC ....... H04W 12/06; H04W 12/63; H04W 4/80; H04W 12/02; H04W 12/03; H04W 48/08; H04L 12/12
See application file for complete search history.

(56) References Cited

U.S. PATENT DOCUMENTS

| | | | |
|---|---|---|---|
| 10,637,650 B2* | 4/2020 | Beiter | H04L 9/3234 |
| 2012/0207056 A1* | 8/2012 | Ree | H04W 8/245 |
| | | | 370/254 |
| 2014/0220894 A1 | 8/2014 | Chen et al. | |
| 2016/0080940 A1* | 3/2016 | Pang | H04W 4/80 |
| | | | 455/411 |
| 2017/0078839 A1* | 3/2017 | Dong | H04W 76/15 |

FOREIGN PATENT DOCUMENTS

| | | |
|---|---|---|
| CN | 104537298 A | 4/2015 |
| CN | 104780204 A | 7/2015 |
| CN | 105101339 A | 11/2015 |
| CN | 106131828 A | 11/2016 |
| CN | 107683602 A | 2/2018 |
| CN | 108616847 A | 10/2018 |
| CN | 106209386 B | 9/2019 |
| CN | 110611905 A | 12/2019 |

\* cited by examiner

INFORMATION SHARING METHOD, TERMINAL DEVICE, STORAGE MEDIUM, AND COMPUTER PROGRAM PRODUCT

CROSS-REFERENCE TO RELATED APPLICATIONS

This application is a continuation of International Application No. PCT/CN2020/105143, filed on Jul. 28, 2020, which claims priority to Chinese Patent Application No. 201910735944.6, filed on Aug. 9, 2019. The disclosures of the aforementioned applications are hereby incorporated by reference in their entireties.

TECHNICAL FIELD

This application belongs to the field of communication technologies, and in particular, to an information sharing method, a terminal device, a storage medium, and a computer program product.

BACKGROUND

With the advancement of science and technology, there are more and more types of electronic devices used by people in daily life, for example, a mobile phone, a wearable device, a tablet computer, a notebook computer, a Bluetooth headset, and a router. The electronic devices may be connected to or paired with each other.

In an application scenario, when a user needs to pair at least two terminal devices with the same Bluetooth headset, the user triggers, by using an interactive interface of each terminal device, the terminal device to search for a Bluetooth device, and the user selects a to-be-paired Bluetooth device from a list of found devices, so that the terminal device establishes a communication connection to the Bluetooth headset. For example, when the user needs to pair both a mobile phone and a tablet computer with the same Bluetooth headset, the user needs to operate, by using an interactive interface of the mobile phone, the mobile phone to be paired with the Bluetooth headset, and operate, by using an interactive interface of the tablet computer, the tablet computer to be paired with the Bluetooth headset.

However, in this method for establishing the communication connections among the at least two terminal devices and the same Bluetooth headset, the user needs to repeatedly perform a pairing connection operation on each terminal device. The operations are relatively complex, and therefore pairing efficiency is relatively low.

SUMMARY

Embodiments of this application provide an information sharing method, a terminal device, a storage medium, and a computer program product, to solve a problem in the current technology that when a user needs to connect or pair at least two terminal devices with another terminal device, the user needs to repeatedly perform a pairing or connection operation on each terminal device, the operations are relatively complex, and therefore operation efficiency is relatively low.

According to a first aspect, an embodiment of this application provides an information sharing method, including: A first terminal device establishes a communication connection to a second terminal device; the first terminal device performs identity authentication on a third terminal device through near field communication (NFC) when detecting the third terminal device; and the first terminal device sends communication link information to the third terminal device by using a short-range wireless communication technology when determining that an identity of the third terminal device is valid, where the communication link information is used to establish a communication connection between the third terminal device and the second terminal device.

Optionally, the short-range wireless communication technology may be NFC, Bluetooth communication, or wireless fidelity (Wi-Fi).

Optionally, when determining that the identity of the third terminal device is valid, the first terminal device may prompt a user by using a text or voice message. After the first terminal device establishes a communication connection to the third terminal device, the third terminal device may also send, to the first terminal device, information that needs to be shared.

The first terminal device and the third terminal device are trusted devices under the same user account. The user account is used to identify identity information of the owner of the user account, and the user account may be a pre-registered account. Trusted devices refer to user devices trusted by the owner of the user account, and the trusted devices have information sharing rights among themselves. The first terminal device and the third terminal device have synchronized identity information of all trusted devices by logging in to the user account in advance. In other words, the identity information of all the trusted devices is pre-stored in the first terminal device and the third terminal device.

In the foregoing solution, after the first terminal device establishes the communication connection to the second terminal device, when the first terminal device approaches the third terminal device, the first terminal device can quickly and conveniently establish the communication connection to the third terminal device, and further share the communication link information, so that the third terminal device uses the communication link information to establish a communication connection to the second terminal device when detecting the second terminal device. The third terminal device can establish the communication connection to the second terminal device without requiring another device to participate in data exchange and without requiring the user to operate the third terminal device. This may simplify the operation steps of establishing the communication connection between the third terminal device and the second terminal device, thereby further improving efficiency of establishing communication connections among at least three terminal devices.

With reference to the first aspect, in a first possible implementation of the first aspect, both a cellular mobile network and a wireless local area network of the third terminal device are in a disabled state, and the short-range wireless communication technology is NFC or Bluetooth communication.

Both the cellular mobile network and the wireless local area network of the third terminal device being in the disabled state means that the third terminal device does not enable the cellular mobile network and the wireless local area network, or currently cannot access the Internet through the cellular mobile network or the wireless local area network.

In this solution, the first terminal device and the third terminal device may share information through NFC or Bluetooth communication. Therefore, even if the third terminal device cannot access the Internet through the cellular mobile network or the wireless local area network, the first terminal device may still share information with the third terminal device. An application scenario is not limited by the Internet, so that the solution is more widely used.

With reference to the first aspect, in a second possible implementation of the first aspect, the second terminal device is a terminal device that completes pairing with the first terminal device in advance, and the communication link information includes Bluetooth pairing information. After receiving the Bluetooth pairing information, the third terminal device performs pairing with the second terminal device by using the received Bluetooth pairing information when detecting the second terminal device.

With reference to the first aspect, the first aspect, or the second implementation of the first aspect, in a third possible implementation of the first aspect, the communication link information includes access information of a wireless network and/or NFC access control identification information.

The access information of a wireless network is used to connect to a router, an access point, or a personal hotspot. The access information may be a service set identifier (SSID) and an access password. In this case, when entering a signal coverage area of a wireless network corresponding to any SSID, the third terminal may access, by using access information of a wireless network, the wireless network currently accessed by the first terminal device or the wireless network previously accessed by the first terminal device.

The NFC access control identification information is used to identify authorization information, for example, NFC access control authorization information. In this case, the third terminal device may be used as an NFC access control card to communicate with the second terminal device, to implement functions such as opening a door.

With reference to the first aspect, in a fourth possible implementation of the first aspect, that the first terminal device performs identity authentication on a third terminal device through near field communication (NFC) when detecting the third terminal device includes: After establishing the communication connection to the second terminal device, the first terminal device sends an identity authentication notification message to the third terminal device through NFC when approaching the third terminal device; the first terminal device obtains first identity information returned by the third terminal device through NFC when the third terminal device receives the identity authentication notification message; and the first terminal device performs identity authentication on the third terminal device based on the first identity information and pre-stored second identity information.

With reference to the fourth possible implementation of the first aspect, in a fifth possible implementation of the first aspect, the first identity information includes a first device identifier and a first public key of the third terminal device. That the first terminal device performs identity authentication on the third terminal device based on the first identity information and the pre-stored second identity information includes: The first terminal device obtains, from an identity database based on the first device identifier, a pre-stored public key corresponding to the third terminal device; performs identity authentication on the third terminal device based on the first public key and the pre-stored public key; and when the first public key is the same as the pre-stored public key, determines that the identity of the third terminal device is valid.

With reference to the fourth possible implementation of the first aspect, in a sixth possible implementation of the first aspect, the first identity information includes a first device identifier of the third terminal device, a first version number of a public key attribute credential of the third terminal device, and a first random number generated by the third terminal device. That the first terminal device performs identity authentication on the third terminal device based on the first identity information and the pre-stored second identity information includes: The first terminal device obtains a first public key of the third terminal device based on the first device identifier and the first version number; the first terminal device calculates a first shared key based on a private key of the first terminal device and the first public key, and generates a second random number; the first terminal device calculates a first identity feature value based on the first shared key, a second device identifier of the first terminal device, the first random number, and the second random number; the first terminal device sends the first identity feature value, the second device identifier of the first terminal device, a second version number of the public key attribute credential, and the second random number to the third terminal device through near field communication; the first terminal device receives a second identity feature value returned by the third terminal device, where the second identity feature value is obtained through calculation by the third terminal device based on a second shared key, the second device identifier, the first random number, and the second random number when the third terminal device obtains the second shared key through calculation, and the second shared key is obtained through calculation based on a private key of the third terminal device and a public key of the first terminal device; and when determining that the first identity feature value is the same as the second identity feature value, the first terminal device determines that the identity of the third terminal device is valid.

With reference to the sixth possible implementation of the first aspect, in a seventh possible implementation of the first aspect, that the first terminal device obtains a first public key of the third terminal device based on the first device identifier and the first version number includes: The first terminal device searches an identity database for a device identifier that matches the first device identifier; and when the matched device identifier is found, and the first version number is less than or equal to the pre-stored second version number of the public key attribute credential, obtains the public key of the third terminal device from the identity database, or when the matched device identifier is not found, and the first version number is greater than the pre-stored second version number of the public key attribute credential, requests to obtain the first public key from the third terminal device.

In this solution, the first version number and the second version number of the public key attribute credential are compared, to determine whether a trust qualification of the third terminal device is revoked, or determine whether the third terminal device is a newly added trusted device. In this way, an offline device is also relatively secure, and validity of a public key of each device does not need to be confirmed online at any time. When the first version number is greater than the second version number, it is determined that the third terminal device is a newly added trusted device. When the first version number is less than the second version number, and no device identifier that matches the first device identifier is found in the local database, it is determined that the trust qualification of the third terminal device is revoked.

With reference to the seventh possible implementation of the first aspect, in an eighth possible implementation of the first aspect, after the first terminal device searches the identity database for the device identifier that matches the first device identifier, the method further includes: When the matched device identifier is not found, and the first version number is less than the pre-stored second version number of the public key attribute credential, determining that the identity of the third terminal device is invalid.

With reference to the first aspect and any implementation of the first aspect, in a ninth possible implementation of the first aspect, that the first terminal device sends communication link information to the third terminal device by using a short-range wireless communication technology when determining that an identity of the third terminal device is valid includes: The first terminal device generates a session key when determining that the identity of the third terminal device is valid, and sends the session key to the third terminal device by using the short-range wireless communication technology; and the first terminal device encrypts the communication link information by using the session key, and sends encrypted data to the third terminal device by using the short-range wireless communication technology.

In this solution, the communication link information is encrypted by using the session key, so that security of to-be-shared data in a transmission process can be improved. Even if another untrusted device receives the encrypted communication link information, the communication link information cannot be directly obtained. In this way, another untrusted device is prevented from being connected to the second terminal device by using the communication link information, to further protect security of data in the second terminal device.

According to a second aspect, an embodiment of this application provides an information sharing apparatus, including: an identity authentication unit, configured to: after a first terminal device establishes a communication connection to a second terminal device, when the first terminal device approaches a third terminal device, perform identity authentication on the third terminal device through near field communication (NFC); and an information sharing unit, configured to: when determining that an identity of the third terminal device is valid, send communication link information to the third terminal device by using a short-range wireless communication technology, to trigger the third terminal device to establish a communication connection to the second terminal device by using the communication link information when detecting the second terminal device.

Optionally, the short-range wireless communication technology may be NFC, Bluetooth communication, or wireless fidelity (Wi-Fi).

In the foregoing solution, after the first terminal device establishes the communication connection to the second terminal device, when the first terminal device approaches the third terminal device, the first terminal device can quickly and conveniently establish a communication connection to the third terminal device, and further share the communication link information, so that the third terminal device uses the communication link information to establish the communication connection to the second terminal device when detecting the second terminal device. The third terminal device can establish the communication connection to the second terminal device without requiring another device to participate in data exchange and without requiring a user to operate the third terminal device. This may simplify the operation steps of establishing the communication connection between the third terminal device and the second terminal device, thereby further improving efficiency of establishing communication connections among at least three terminal devices.

With reference to the second aspect, in a first possible implementation of the second aspect, both a cellular mobile network and a wireless local area network of the third terminal device are in a disabled state, and the short-range wireless communication technology is NFC or Bluetooth communication.

In this solution, the first terminal device and the third terminal device may share information through NFC or Bluetooth communication. Therefore, even if the third terminal device cannot access the Internet through the cellular mobile network or the wireless local area network, the first terminal device may still share information with the third terminal device. An application scenario is not limited by the Internet, so that the solution is more widely used.

With reference to the second aspect, in a second possible implementation of the second aspect, the second terminal device is a terminal device that completes pairing with the first terminal device in advance, and the communication link information includes Bluetooth pairing information. After receiving the Bluetooth pairing information, the third terminal device performs pairing with the second terminal device by using the received Bluetooth pairing information when detecting the second terminal device.

With reference to the second aspect, the second aspect or the second implementation of the second aspect, in a third possible implementation of the second aspect, the communication link information sent by the information sharing unit includes access information of a wireless network and/or NFC access control identification information.

The access information of the wireless network is used to connect to a router, an access point, or a personal hotspot. The access information may be an SSID and an access password. In this case, when entering a signal coverage area of a wireless network corresponding to any SSID, the third terminal may access, by using access information of a wireless network, the wireless network currently accessed by the first terminal device or the wireless network previously accessed by the first terminal device.

The NFC access control identification information is used to identify authorization information, for example, NFC access control authorization information. In this case, the third terminal device may be used as an NFC access control card to communicate with the third terminal device, to implement functions such as opening a door.

With reference to the second aspect, in a fourth possible implementation of the second aspect, the identity authentication unit includes: a sending unit, configured to: after the first terminal device establishes the communication connection to the second terminal device, when the first terminal device approaches the third terminal device, send an identity authentication notification message to the third terminal device through NFC; a receiving unit, configured to obtain first identity information returned by the third terminal device through NFC when the third terminal device receives the identity authentication notification message; and an authentication unit, configured to perform identity authentication on the third terminal device based on the first identity information and pre-stored second identity information.

With reference to the fourth possible implementation of the second aspect, in a fifth possible implementation of the second aspect, the first identity information includes a first device identifier and a first public key of the third terminal device. The authentication unit is configured to: obtain, from an identity database based on the first device identifier, a pre-stored public key corresponding to the third terminal device; perform identity authentication on the third terminal device based on the first public key and the pre-stored public key; and when the first public key is the same as the pre-stored public key, determine that the identity of the third terminal device is valid.

With reference to the fourth possible implementation of the second aspect, in a sixth possible implementation of the second aspect, the first identity information includes a first device identifier of the third terminal device, a first version number of a public key attribute credential of the third terminal device, and a first random number generated by the third terminal device. The authentication unit includes: a public key obtaining unit, configured to obtain a first public key of the third terminal device based on the first device identifier and the first version number; a random number generation unit, configured to calculate a first shared key based on a private key of the first terminal device and the first public key, and generate a second random number; and a calculation unit, configured to calculate a first identity feature value based on the first shared key, a second device identifier of the first terminal device, the first random number, and the second random number. The sending unit is further configured to send, by the first terminal device, the first identity feature value, the second device identifier of the first terminal device, a second version number of the public key attribute credential, and the second random number to the third terminal device through near field communication. The receiving unit is further configured to receive a second identity feature value returned by the third terminal device, where the second identity feature value is obtained through calculation by the third terminal device based on a second shared key, the second device identifier, the first random number, and the second random number when the third terminal device obtains the second shared key through calculation, and the second shared key is obtained through calculation based on a private key of the third terminal device and a public key of the first terminal device. The authentication unit further includes a comparison unit, configured to: when determining that the first identity feature value is the same as the second identity feature value, determine that the identity of the third terminal device is valid.

With reference to the sixth possible implementation of the second aspect, in a seventh possible implementation of the second aspect, the public key obtaining unit is configured to: search an identity database for a device identifier that matches the first device identifier; and when the matched device identifier is found, and the first version number is less than or equal to the pre-stored second version number of the public key attribute credential, obtain the public key of the third terminal device from the identity database, or when the matched device identifier is not found, and the first version number is greater than the pre-stored second version number of the public key attribute credential, request to obtain the first public key from the third terminal device.

In this solution, the first version number and the second version number of the public key attribute credential are compared, to determine whether a trust qualification of the third terminal device is revoked, or determine whether the third terminal device is a newly added trusted device. In this way, an offline device is also relatively secure, and validity of a public key of each device does not need to be confirmed online at any time. When the first version number is greater than the second version number, it is determined that the third terminal device is a newly added trusted device. When the first version number is less than the second version number, and no device identifier that matches the first device identifier is found in the local database, it is determined that the trust qualification of the third terminal device is revoked.

With reference to the seventh possible implementation of the second aspect, in an eighth possible implementation of the second aspect, the public key obtaining unit is further configured to: when the matched device identifier is not found, and the first version number is less than the pre-stored second version number of the public key attribute credential, determine that the identity of the third terminal device is invalid.

With reference to the second aspect and any implementation of the second aspect, in a ninth possible implementation of the second aspect, the information sharing unit is configured to: generate a session key when determining that the identity of the third terminal device is valid; send the session key to the third terminal device by using the short-range wireless communication technology; encrypt the communication link information by using the session key; and send encrypted data to the third terminal device by using the short-range wireless communication technology.

In this solution, the communication link information is encrypted by using the session key, so that security of to-be-shared data in a transmission process can be improved. Even if another untrusted device receives the encrypted communication link information, the communication link information cannot be directly obtained. In this way, another untrusted device is prevented from being connected to the second terminal device by using the communication link information, to further protect security of data in the second terminal device.

According to a third aspect, an embodiment of this application provides a terminal device, including a memory, a processor, and a computer program that is stored in the memory and that can be run on the processor. When executing the computer program, the processor implements the information sharing method according to any possible implementation of the first aspect.

According to a fourth aspect, an embodiment of this application provides a computer-readable storage medium. The computer-readable storage medium stores a computer program, and when the computer program is executed by a processor, the information sharing method according to any possible implementation of the first aspect is implemented.

According to a fifth aspect, an embodiment of this application provides a computer program product. When the computer program product runs on a terminal device, the terminal device is enabled to perform the information sharing method according to any possible implementation of the first aspect.

Compared with the current technology, the embodiments of this application have the following beneficial effects:

After the first terminal device establishes the communication connection to the second terminal device, when the first terminal device approaches the third terminal device, the first terminal device can quickly and conveniently establish the communication connection to the third terminal device, and further share the communication link information, so that the third terminal device uses the communication link information to establish the communication connection to the second terminal device when detecting the second terminal device. The third terminal device can establish the communication connection to the second terminal device without requiring another device to participate in data exchange and without requiring the user to operate the third terminal device. This may simplify the operation steps of establishing the communication connection between the third terminal device and the second terminal device, thereby further improving efficiency of establishing communication connections among at least three terminal devices.

The first terminal device and the third terminal device may share information through NFC or Bluetooth communication. Therefore, even if the third terminal device cannot access the Internet through the cellular mobile network or the wireless local area network, the first terminal device may still share information with the third terminal device. The application scenario is not limited by the Internet, so that the solution is more widely used.

BRIEF DESCRIPTION OF DRAWINGS

To describe the technical solutions in the embodiments of this application more clearly, the following briefly describes the accompanying drawings for describing the embodiments or the current technology. It is clear that the accompanying drawings in the following description show some embodiments of this application, and a person of ordinary skill in the art may still derive other drawings from these accompanying drawings without creative efforts.

DESCRIPTION OF EMBODIMENTS

In the following descriptions, to illustrate rather than limit, specific details such as a particular system structure and a technology are provided to make a thorough understanding of the embodiments of this application. However, a person skilled in the art should know that this application may be implemented in other embodiments without these specific details. In other cases, detailed descriptions of well-known systems, apparatuses, circuits, and methods are omitted, so that this application is described without being obscured by unnecessary details.

Figure 1:
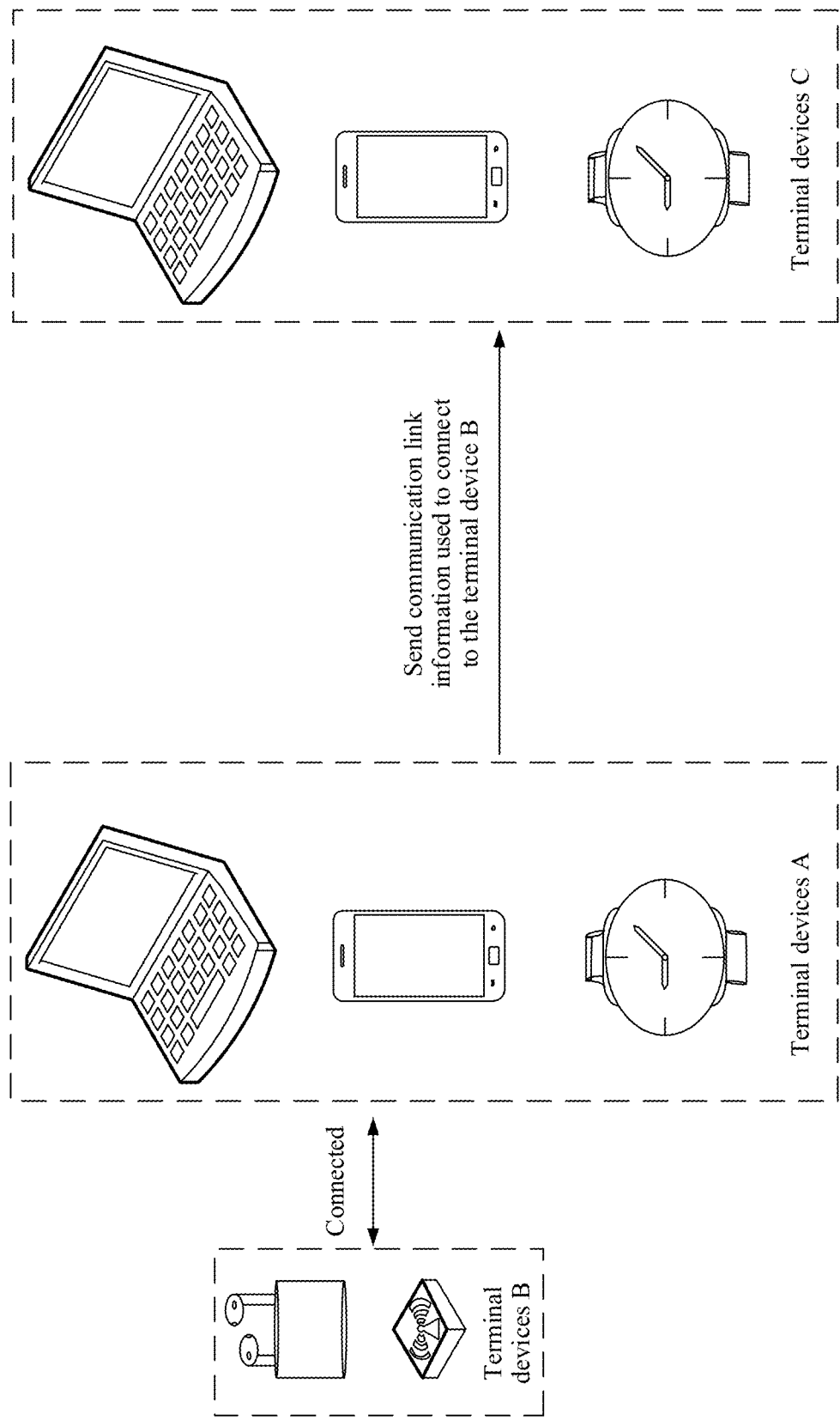
FIG. 1 is a schematic diagram of a system of an information sharing method according to an embodiment of this application.

FIG. 1 is a schematic diagram of a system of an information sharing method according to an embodiment of this application. In the schematic diagram of the system shown in FIG. 1, the system includes a terminal device A, a terminal device B, and a terminal device C. The terminal device A already establishes a communication connection to the terminal device B. In this embodiment, the terminal device A corresponds to the first terminal device in the claims, the terminal device B corresponds to the second terminal device in the claims, and the terminal device C corresponds to the third terminal device in the claims.

The terminal device A and the terminal device C are trusted devices under the same user account. The user account is used to identify identity information of an owner of the user account, and the user account may be a pre-registered account. Trusted devices refer to user devices trusted by the owner of the user account, and the trusted devices have information sharing rights among themselves. The terminal device A and the terminal device C have synchronized identity information of all trusted devices by logging in to the user account in advance. In other words, the identity information of all the trusted devices is pre-stored in the terminal device A and the terminal device C. The terminal device A and the terminal device C include but are not limited to a mobile phone, a notebook computer, a tablet computer, and a wearable device. The terminal device B includes but is not limited to a Bluetooth headset, a router, an access point, a personal hotspot device, a mobile phone, and an access control terminal.

When the terminal device A approaches the terminal device C, the terminal device A performs identity authentication on the terminal device C through near field communication (NFC). When determining that an identity of the terminal device C is valid, the terminal device A may quickly establish a communication connection to the terminal device C through NFC. Then, the terminal device A and the terminal device C may share, by using a short-range wireless communication technology, communication link information used to connect to the terminal device B. The short-range wireless communication technology may be NFC communication, Bluetooth communication, or wireless fidelity (Wi-Fi). The communication link information may be Bluetooth pairing information, an NFC label, or access information used to access a wireless local area network. The access information may be a service set identifier (SSID) and an access password, for example, access information or access password of the router.

NFC access control identification information is used to identify authorization information, for example, NFC access control authorization information. In this case, the terminal device C may be used as an NFC access control card to communicate with the terminal device B, to implement functions such as opening a door. In this case, the terminal device B is an access control terminal.

In the solution of this application, after the terminal device A establishes the communication connection to the terminal device B, when the terminal device B approaches the terminal device C, the terminal device B may quickly and conveniently establishes a communication connection to the terminal device C, without requiring a user to operate the terminal device C. This may simplify the operation steps of establishing the communication connection between the terminal device C and the terminal device A, thereby improving efficiency of establishing communication connections among the at least three terminal devices.

In addition, the terminal device B and the terminal device C may share information through NFC. Therefore, even if the terminal device C cannot access the Internet through a cellular mobile network or a wireless local area network, the terminal device B may still share information with the terminal device C. An application scenario is not limited by the Internet, so that the solution is more widely used.

For ease of understanding, the following provides description with reference to specific application scenarios.

Figure 2:
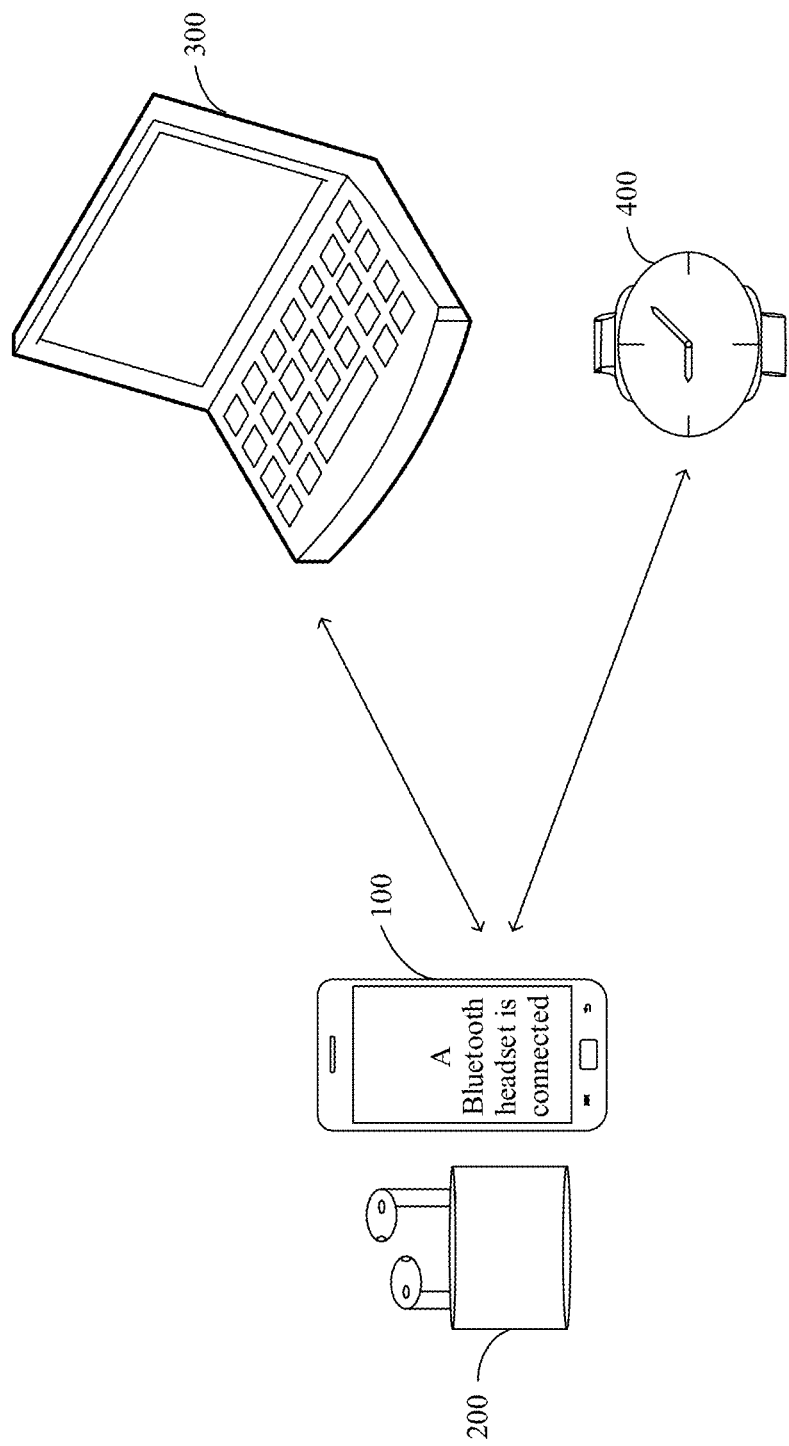
FIG. 2 is a schematic diagram of an application scenario of an information sharing method according to an embodiment of this application.
Figure 3:
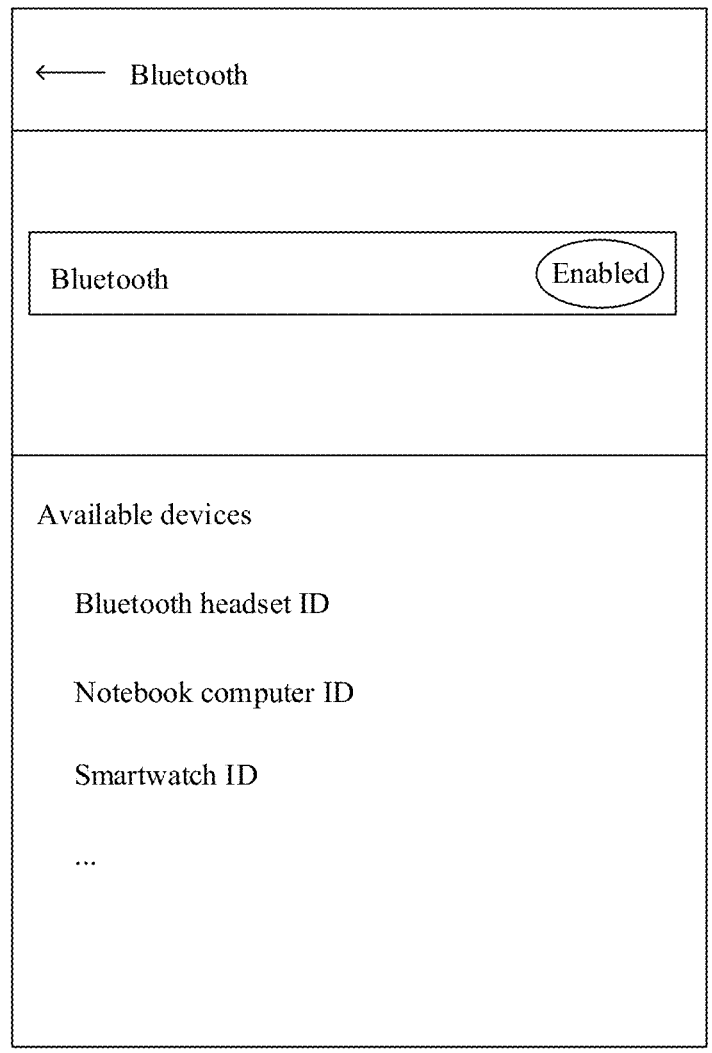
FIG. 3 is a schematic diagram of a Bluetooth pairing interface according to an embodiment of this application.

Refer to FIG. 2 and FIG. 3. FIG. 2 is a schematic diagram of an application scenario of an information sharing method according to an embodiment of this application, and FIG. 3 is a schematic diagram of a Bluetooth pairing interface according to an embodiment of this application. As shown in FIG. 2, in an application scenario in which a user wants to pair at least two of a mobile phone, a notebook computer, and a smartwatch with a same Bluetooth headset at the same time, the user operates a mobile phone 100 to open the Bluetooth pairing interface shown in FIG. 3, and triggers the mobile phone 100 to search for a nearby available device. When available devices are found, IDs (for example, a Bluetooth headset ID, a notebook computer ID, and a smartwatch ID) of the available devices are displayed on an interactive interface. The user taps the Bluetooth headset ID to trigger pairing of the mobile phone 100 with a Bluetooth headset 200. If a password is required to complete pairing, a dialog box for prompting the user to enter the password is further popped up on a display interface of the mobile phone 100. After the user enters the corresponding password in the dialog box and confirms the connection, the mobile phone 100 can be paired with the Bluetooth headset 200.

After the mobile phone 100 is paired with the Bluetooth headset 200, if the user moves the mobile phone 100 near a notebook computer 300 or a smartwatch 400, the mobile phone 100 may perform identity authentication on the notebook computer 300 or the smartwatch 400 based on NFC, and establish a communication connection with the notebook computer 300 or the smartwatch 400 when determining that an identity of the notebook computer 300 or the smartwatch 400 is valid. Then, the mobile phone 100 may share, with the notebook computer 300 or the smartwatch 400 by using a short-range wireless communication technology, Bluetooth pairing information used for pairing with the Bluetooth headset 200. In this way, the notebook computer 300 or the smartwatch 400 stores the Bluetooth pairing information when receiving the Bluetooth pairing information, and then performs pairing with the Bluetooth headset 200 by using the Bluetooth pairing information when detecting the Bluetooth headset 200. The short-range wireless communication technology may be NFC communication, Bluetooth communication, or Wi-Fi.

After the mobile phone 100 shares the Bluetooth pairing information with the notebook computer 300 or the smartwatch 400, in a process in which the notebook computer 300 or the smartwatch 400 establishes a communication connection to the Bluetooth headset 200, pairing between the smartwatch and the Bluetooth headset can be implemented and the communication connection can be established without requiring the user to search for and select the Bluetooth headset ID on an interactive interface of the smartwatch and enter a pairing key of the Bluetooth headset. The entire process does not require user participation, thereby simplifying an operation step of pairing between the smartwatch and the Bluetooth headset. Further, efficiency of establishing communication connections between the mobile phone, the smartwatch, the notebook computer, and the Bluetooth headset is improved. In addition, the mobile phone 100 and the notebook computer 300 or the smartwatch 400 may share information through NFC or Bluetooth. Therefore, even if the notebook computer, the smartwatch, and the mobile phone do not access the Internet, the mobile phone in an offline state may still send the Bluetooth pairing information to the smartwatch or the notebook computer that is in an offline state.

Figure 4:
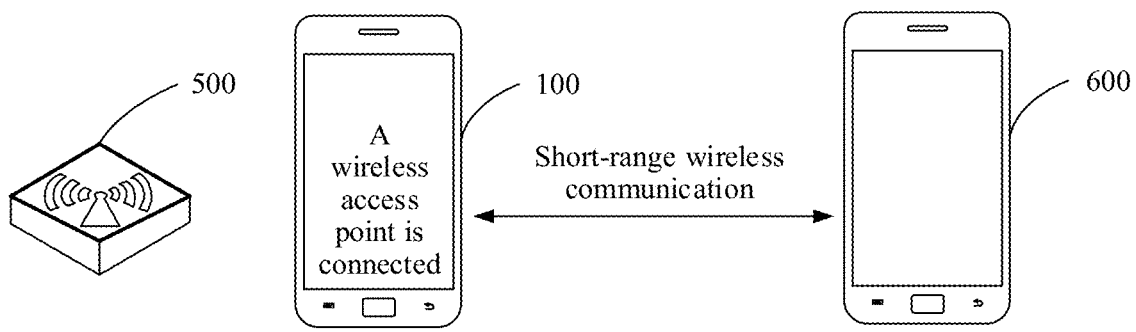
FIG. 4 is a schematic diagram of an application scenario of an information sharing method according to another embodiment of this application.

In another application scenario, communication link information used to access a wireless local area network may be shared between terminal devices. FIG. 4 is a schematic diagram of an application scenario of an information sharing method according to another embodiment of this application.

For example, a user carries a mobile phone 100 and a mobile phone 600 to a friend's house, and neither the mobile phone 100 nor the mobile phone 600 is connected to a wireless router 500 at the friend's house. When the user finds an SSID of the wireless router 500 on a setting interface of the mobile phone 100, the user taps the SSID, enters an access password of the wireless router 500 on a pop-up password entering interface, and taps "join", so that the mobile phone 100 successfully accesses to the wireless router. Alternatively, the mobile phone 100 has been connected to the wireless router at the friend's house when the user visits the friend's house last time, so that when the user visits the friend's house, the mobile phone 100 is automatically connected to the wireless router 500 at the friend's house.

The mobile phone 600 is not connected to the wireless router 500 at the friend's house before. Therefore, when the mobile phone 100 is connected to the wireless router 500 at the friend's house, the user may move the mobile phone 100 close to the mobile phone 600. In this case, the mobile phone 100 performs identity authentication on the mobile phone 600 by using a short-range communication technology. When the mobile phone 100 authenticates that an identity of the mobile phone 600 is valid, the mobile phone 100 establishes a communication connection to the mobile phone 600. The mobile phone 100 may share Wi-Fi access information with the mobile phone 600 by using the short-range wireless communication technology, so that after receiving the Wi-Fi access information, the mobile phone 600 accesses the wireless router 500 at the friend's house based on the received Wi-Fi access information when detecting the wireless router 500. The shared Wi-Fi access information may be access information used to access the wireless router 500 (or a personal hotspot or a wireless access point) or access information of a wireless local area network accessed by the mobile phone 100.

For another example, the user takes the mobile phone 100 to the friend's house last time, and the mobile phone 100 is successfully connected to the wireless router 500 at the friend's house. Then, after the user returns to the user's house, the mobile phone 100 and the mobile phone 600 exchange communication link information, and the mobile phone 600 stores the Wi-Fi access information used to access the wireless router 500. Then, when the user goes to the friend's house with only the mobile phone 600, the mobile phone 600 may also be connected to the wireless router 500 by using the pre-stored Wi-Fi access information when the wireless router 500 is detected. After the mobile phone 100 accesses the wireless router 500, in a process in which the mobile phone 600 establishes a communication connection to the wireless router 500, the mobile phone 600 may be connected to the wireless router 500 without requiring the user to search for the SSID of the wireless router 500 on an interactive interface of the mobile phone 600 and enter the access password of the wireless router 500. The entire process does not require user participation, thereby simplifying an operation step of connecting the mobile phone 600 to the wireless router 500. Further, efficiency of establishing the communication connection between the mobile phone 600 and the wireless router 500 is improved. In addition, the mobile phone 100 and the mobile phone 600 may share information through NFC or Bluetooth. Therefore, even if the mobile phone 600 does not access the Internet, the mobile phone 100 may still send the access information of the wireless router 500 to the mobile phone 600.

It may be understood that terms used in this application are merely intended to describe specific embodiments, but are not intended to limit this application. Terms "one", "a", "the", "the foregoing", "this", and "the one" of singular forms used in this specification and the appended claims of this application are also intended to include forms like "one or more", unless otherwise specified in the context clearly. It should be further understood that, in the embodiments of this application, "one or more" means one, two, or more, and the term "and/or" describes an association between associated objects, and indicates that three relationships may exist. For example, A and/or B may indicate the following cases: Only A exists, both A and B exist, and only B exists, where A and B may be singular or plural. The character "/" generally indicates an "or" relationship between the associated objects.

An information sharing method provided in the embodiments of this application may be applied to a terminal device that supports near field communication, for example, a mobile phone, a tablet computer, a wearable device, a vehicle-mounted device, an augmented reality (AR)/virtual reality (VR) device, a notebook computer, a netbook, or a personal digital assistant (PDA). A specific type of the terminal device is not limited in the embodiments of this application. A terminal device that is paired with or connected to the terminal device in communication may be a Bluetooth headset, a wireless access point, a personal hotspot, or the like.

When the terminal device is a wearable device, the wearable device may alternatively be a generic term for wearable devices such as glasses, gloves, watches, clothes, and shoes that are developed based on intelligent design of daily wearing by using wearable technologies. The wearable device is a portable device that is directly worn on a body or integrated into clothes or an accessory of a user. The wearable device is not only a hardware device, but also implements a powerful function through software support, data exchange, and cloud interaction. Generalized wearable intelligent devices include full-featured and large-size devices that can implement complete or partial functions without depending on a mobile phone, for example, a smartwatch or smart glasses, and devices that focus on only one type of application function and need to work with another device such as a mobile phone, for example, various smart bands or smart accessories for monitoring physical signs.

Figure 5:
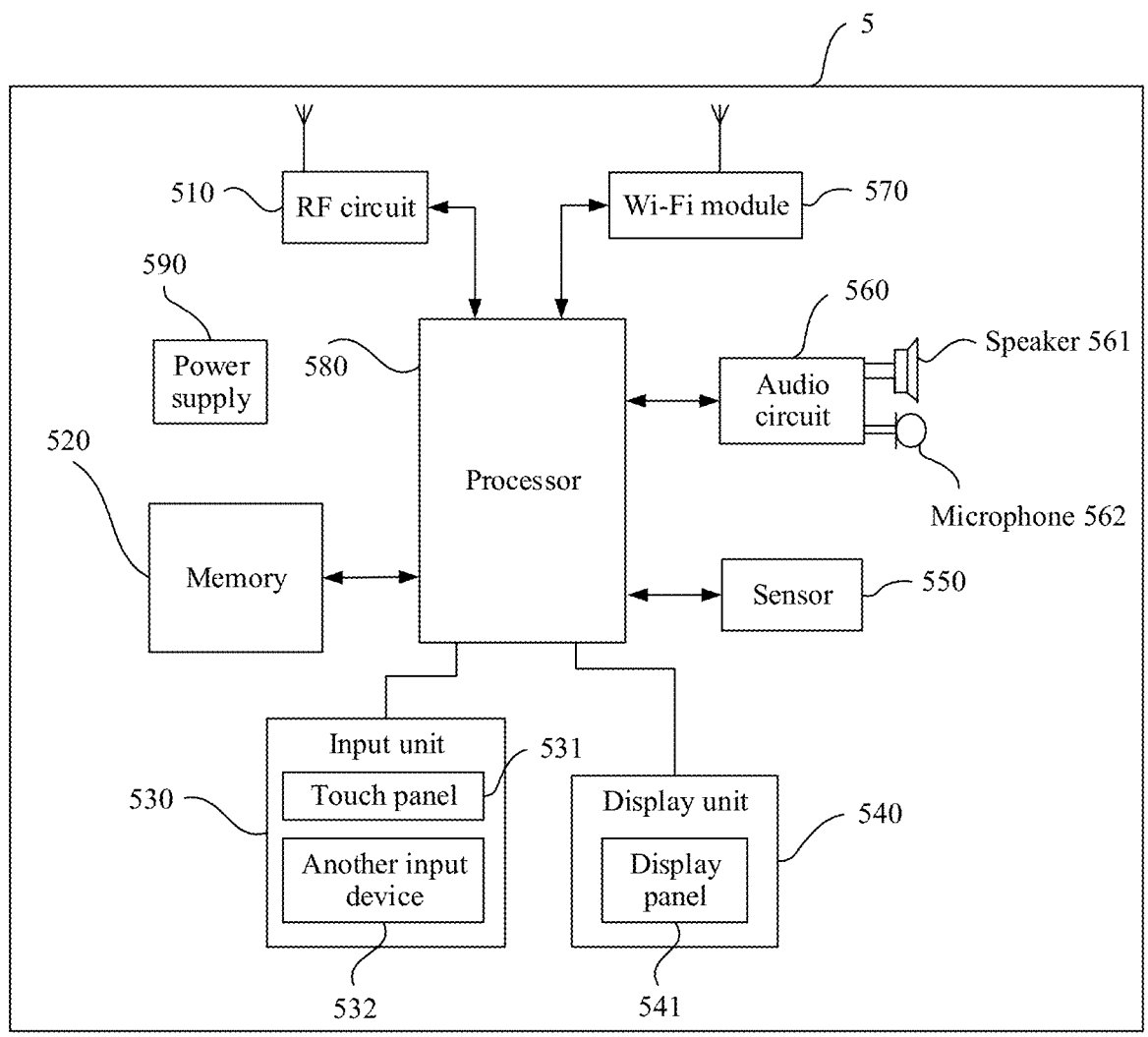
FIG. 5 is a schematic diagram of a hardware structure of a mobile phone to which an information sharing method is applicable according to an embodiment of this application.

For example, the terminal device is a mobile phone. FIG. 5 is a block diagram of a partial structure of the mobile phone according to an embodiment of this application. As shown in FIG. 5, a mobile phone 5 includes components such as a radio frequency (Radio Frequency, RF) circuit 510, a memory 520, an input unit 530, a display unit 540, a sensor 550, an audio circuit 560, a Wi-Fi module 570, a processor 580, and a power supply 590. A person skilled in the art may understand that the structure of the mobile phone shown in FIG. 5 does not constitute a limitation on the mobile phone, and the mobile phone may include more or fewer components than those shown in the figure, or some components are combined, or a different component arrangement may be used.

The following describes each component of the mobile phone 5 in detail with reference to FIG. 5.

The RF circuit 510 may be configured to receive and send signals in an information receiving and sending process or a call process. In particular, after receiving downlink information from a base station, the RF circuit 510 sends the downlink information to the processor 580 for processing. In addition, the RF circuit 510 sends related uplink data to the base station. The RF circuit usually includes but is not limited to an antenna, at least one amplifier, a transceiver, a coupler, a low noise amplifier (LNA), a duplexer, and the like. In addition, the RF circuit 510 may further communicate with a network and another device through wireless communication. The wireless communication may use any communications standard or protocol, including but not limited to a global system for mobile communications (GSM), a general packet radio service (GPRS), code division multiple access (CDMA), wideband code division multiple access (WCDMA), long term evolution (LTE), an email, a short message service (SMS), and the like.

The memory 520 may be configured to store an information sharing software program and a module. The processor 180 executes various function applications of the mobile phone and processes data by running the information sharing software program and the module that are stored in the memory 520. For example, the information sharing software program stored in the processor 180 may be used to perform identity authentication on the terminal device C in FIG. 1. The memory 520 may mainly include a program storage area and a data storage area. The program storage area may store an operating system, an application required by at least one function (such as a voice playing function, an image playing function, an NFC communication function, and a Bluetooth communication function), and the like. The data storage area may store data (such as audio data, a phone book, to-be-shared communication link information, access information of a wireless access network, and NFC access control identification information) that is created based on use of the mobile phone, and the like. In addition, the memory 520 may include a high-speed random access memory, and may further include a nonvolatile memory, for example, at least one magnetic disk storage device, a flash storage device, or another volatile solid-state storage device.

The input unit 530 may be configured to: receive entered digit or character information, and generate a key signal input related to a user setting and function control of the mobile phone 5. Specifically, the input unit 530 may include a touch panel 531 and another input device 532. The touch panel 531, also referred to as a touchscreen, may collect a touch operation (for example, an operation performed by a user on the touch panel 531 or near the touch panel 531 by using any proper object or accessory such as a finger or a stylus) performed by the user on or near the touch panel, and drive a corresponding connection apparatus based on a preset program. Optionally, the touch panel 531 may include two parts: a touch detection apparatus and a touch controller. The touch detection apparatus detects a touch position of the user, detects a signal brought by the touch operation, and transmits the signal to the touch controller. The touch controller receives touch information from the touch detection apparatus, converts the touch information into coordinates of a touch point, and then sends the coordinates of the touch point to the processor 580. In addition, the touch controller can receive and execute a command sent by the processor 580. In addition, the touch panel 531 may be implemented in a plurality of types, such as a resistive type, a capacitive type, an infrared type, and a surface acoustic wave type. In addition to the touch panel 531, the input unit 530 may further include another input device 532. Specifically, the other input device 532 may include but is not limited to one or more of a physical keyboard, a function button (for example, a volume control button or a power on/off button), a trackball, a mouse, a joystick, and the like.

The display unit 540 may be configured to display information entered by the user or information provided for the user, and various menus of the mobile phone. The display unit 540 may include a display panel 541. Optionally, the display panel 541 may be configured in a form of a liquid crystal display (LCD), an organic light-emitting diode (OLED), and the like. Further, the touch panel 531 may cover the display panel 541. When detecting a touch operation on or near the touch panel 531, the touch panel 531 transmits the touch operation to the processor 580 to determine a type of a touch event. Then, the processor 580 provides a corresponding visual output on the display panel 541 based on the type of the touch event. In FIG. 5, the touch panel 531 and the display panel 541 are used as two independent parts to implement input and input functions of the mobile phone. However, in some embodiments, the touch panel 531 and the display panel 541 may be integrated to implement the input and output functions of the mobile phone.

The mobile phone 5 may further include at least one sensor 550, such as an optic sensor, a motion sensor, and another sensor. Specifically, the optical sensor may include an ambient light sensor and a proximity sensor. The ambient light sensor may adjust brightness of the display panel 541 based on brightness of ambient light, and the proximity sensor may turn off the display panel 541 and/or backlight when the mobile phone moves to an ear. As a type of the motion sensor, an acceleration sensor may detect a value of an acceleration in each direction (generally, three axes), may detect a value and a direction of gravity in a static state, and may be used in an application for identifying a posture (such as screen switching between landscape and portrait modes, a related game, or magnetometer posture calibration) of the mobile phone, a function related to vibration identification (such as a pedometer or a knock), and the like. For another sensor such as a gyroscope, a barometer, a hygrometer, a thermometer, or an infrared sensor that may further be disposed on the mobile phone. Details are not described herein.

The audio circuit 560, a speaker 561, and a microphone 562 may provide an audio interface between the user and the mobile phone. The audio circuit 160 may convert received audio data into an electrical signal, and then transmit the electrical signal to the speaker 561, and the speaker 161 converts the electrical signal into a sound signal for output. In addition, the microphone 562 converts a collected sound signal into an electrical signal. The audio circuit 560 receives the electrical signal, converts the electrical signal into audio data, and then outputs the audio data to the processor 580 for processing. After the processing, the processor 580 sends the audio data to, for example, another mobile phone through the RF circuit 510, or outputs the audio data to the memory 520 for further processing.

Wi-Fi is a short-distance wireless transmission technology. The mobile phone may help, by using the Wi-Fi module 570, the user receive and send emails, browse a web page, access streaming media, and the like. The Wi-Fi module 570 provides wireless broadband internet access for the user. Although FIG. 5 shows the Wi-Fi module 570, it may be understood that the Wi-Fi module 570 is not a mandatory component of the mobile phone 5, and may be omitted based on a requirement without changing the essence of the present invention.

The processor 580 is a control center of the mobile phone. The processor 580 connects each part of the entire mobile phone through various interfaces and lines. In addition, the processor 580 runs or executes the software program and/or the module that are/is stored in the memory 520 and invokes data stored in the memory 520 to perform various functions of the mobile phone and data processing, so as to perform overall monitoring on the mobile phone. Optionally, the processor 580 may include one or more processing units. Preferably, an application processor and a modem processor may be integrated in the processor 580. The application processor mainly processes an operating system, a user interface, an application, and the like. The modem processor mainly processes wireless communication. It may be understood that the modem processor may alternatively not be integrated into the processor 580.

The mobile phone 5 further includes the power supply 590 (such as a battery) that supplies power to each component. Preferably, the power supply may be logically connected to the processor 580 by using a power management system, so that functions such as management of charging, discharging, and power consumption are implemented by using the power management system.

Although not shown, the mobile phone 5 may further include a camera. Optionally, a position of the camera on the mobile phone 500 may be front-facing or rear-facing. This is not limited in this embodiment of this application.

Optionally, the mobile phone 5 may include a single camera, dual-camera, triple-lens camera, or the like. This is not limited in this embodiment of this application.

For example, the mobile phone 5 may include a triple-lens camera, where one is a primary camera, one is a wide-angle camera, and one is a long-focus camera.

Optionally, when the mobile phone 5 includes a plurality of cameras, the plurality of cameras may be all front-facing, or all rear-facing, or some front-facing and some rear-facing. This is not limited in this embodiment of this application.

In addition, although not shown, the mobile phone 5 may further include a Bluetooth module or the like. The Bluetooth module is configured to: when the mobile phone 100 is paired with the Bluetooth headset 200 in FIG. 2, store the Bluetooth pairing information used to connect to the Bluetooth headset 200 into the memory 580 based on a preset storage path; when the mobile phone 100 establishes the communication connection to the notebook computer 300 or the smartwatch 400, obtain the Bluetooth pairing information used to connect to the Bluetooth headset 200 from the memory 580 based on the preset storage path; and send the obtained Bluetooth pairing information to the notebook computer 300, the smartwatch 400, or the like by using a Bluetooth communication technology. Details are not described herein again.

To make the objectives, technical solutions, and advantages of this application clearer, the following further describes this application in detail with reference to the accompanying drawings. The following embodiments may be implemented by the mobile phone 5 having the foregoing hardware structure. In the following embodiments, the mobile phone 5 is used as an example to describe the information sharing method provided in the embodiments of this application.

Figure 6:
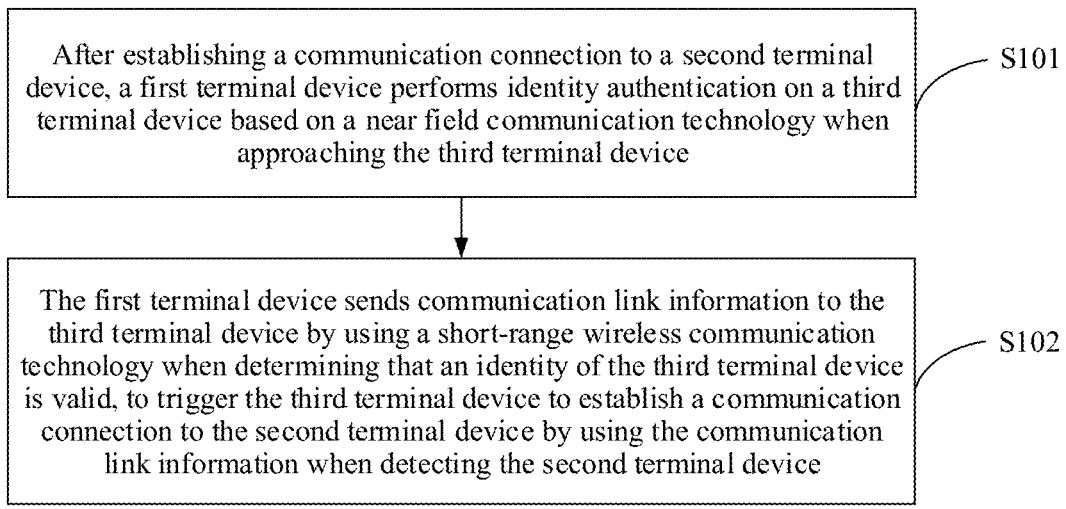
FIG. 6 is a schematic flowchart of an information sharing method according to an embodiment of this application.

FIG. 6 is a schematic flowchart of an information sharing method according to an embodiment of this application. As an example instead of a limitation, the method may be applied to the mobile phone 5. The information sharing method in this example includes the following steps.

S101: After establishing a communication connection to a second terminal device, a first terminal device performs identity authentication on a third terminal device based on a near field communication technology when approaching the third terminal device.

The first terminal device may store identity information of the third terminal device. It may be understood that the first terminal device may be a mobile phone or a terminal such as a notebook computer, a tablet computer, or a wearable device. The second terminal device includes but is not limited to a Bluetooth headset, a router, an access point, a personal hotspot device, a mobile phone, and an access control terminal. The third terminal device may be a mobile phone or a terminal such as a notebook computer, a tablet computer, or a wearable device.

Further, the third terminal device may be in an offline state, that is, the third terminal device does not enable a cellular mobile network and a wireless local area network, or currently cannot access the Internet through the cellular mobile network or the wireless local area network.

After the first terminal device establishes the communication connection to the second terminal device, when a user needs to share information in the first terminal device with the third terminal device, the user may move the first terminal device to a location at which the third terminal device is located, so that the first terminal device is close to the third terminal device. The first terminal device may detect a sounding signal transmitted by the third terminal device, and obtain a received signal strength indication (RSSI) value of the sounding signal transmitted by the third terminal device. The RSSI value is related to a distance between a receive end and a transmit end. To an extent, a closer distance indicates a larger RSSI value. Therefore, the first terminal device may compare RSSI values obtained at two adjacent moments. When the RSSI values obtained at two adjacent moments gradually increase, it is determined that the first terminal device approaches the location at which the third terminal device is located. In this case, the first terminal device may perform identity authentication on the third terminal device based on the near field communication technology.

Alternatively, the first terminal device may detect, by using a short-range wireless communication technology, whether the third terminal device exists around the first terminal device, and perform identity authentication on the third terminal device based on NFC when detecting the third terminal device.

For example, the user may enable a Bluetooth function by using a setting interface, and move the first terminal device close to the third terminal device. When enabling a Bluetooth communication function, the first terminal device detects whether a Bluetooth sounding signal is currently received. When detecting a Bluetooth sounding signal transmitted by another device, the first terminal device determines that the third terminal device exists around the first terminal device. Alternatively, when enabling an NFC function, the first terminal device detects whether an NFC sounding signal is currently received. When detecting an NFC sounding signal transmitted by another device, the first terminal device determines that the third terminal device exists around the first terminal device. It may be understood that, when detecting the third terminal device, the first terminal device may display prompt information or a prompt icon on a display interface or use voice prompt information to remind the user that the third terminal device is currently detected. The prompt information or the prompt icon is used to remind the user that the third terminal device is currently detected. For example, when detecting a third terminal device that supports Bluetooth communication, the first terminal device displays a device ID of the third terminal device on the display interface (for example, the IDs of available devices on the display interface shown in FIG. 3) or displays prompt information used to indicate that "a connectable Bluetooth device is currently detected". When detecting a third terminal device that supports NFC communication, the first terminal device may display, on the display interface, a schematic diagram of the third terminal device or prompt information used to indicate that "a connectable NFC device is currently detected". The schematic diagram of the third terminal device may be similar to a schematic diagram of the watch, the mobile phone, the tablet computer, or the notebook computer shown in FIG. 1.

Further, to more accurately determine a terminal device that needs to share information, when detecting the third terminal device and determining that an RSSI value obtained at any moment is greater than or equal to a preset threshold, the first terminal device may determine that a distance between the first terminal device and the third terminal device falls within a preset distance range. In this case, the user needs to enable the first terminal device to implement information sharing with the third terminal device. The first terminal device performs identity authentication on the third terminal device based on the near field communication technology. The preset threshold is set based on RSSI within the preset distance range, and may be set based on an actual situation. This is not limited herein.

A manner in which the first terminal device performs identity authentication on the third terminal device may be: The first terminal device communicates with the third terminal device through NFC, and requests the third terminal device to return the identity information of the third terminal device. When obtaining the identity information of the third terminal device, the first terminal device searches an identity database for identity information that matches the identity information, and when the matched identity information is found, determines that an identity of the third terminal device is valid, or when the matched identity information is not found, determine that the third terminal device is invalid.

The identity information may be unique identification information of the third terminal device, for example, a media access control (MAC) address, a unique identifier, or a unique serial number. When the third terminal device is a mobile phone, the unique identifier is an international mobile equipment identity (IMEI).

Alternatively, the identity information may be a public key in a key pair of the third terminal device. The key pair includes the public key and a private key, and the key pair may be generated by the third terminal device by using an asymmetric encryption algorithm. A method for generating a key pair by using an asymmetric encryption algorithm is an exiting technology. For details, refer to related descriptions in the existing technology. Details are not described herein again.

The identity information database pre-stores identity information of a terminal device that is allowed by the first terminal device to share information. The identity information of the terminal device pre-stored in the identity information database may be entered by the user in advance, or may be sent by another device. This is not limited herein.

S102: The first terminal device sends communication link information to the third terminal device by using the short-range wireless communication technology when determining that the identity of the third terminal device is valid, to trigger the third terminal device to establish a communication connection to the second terminal device by using the communication link information when detecting the second terminal device.

When determining that the identity of the third terminal device is valid, the first terminal device determines that the third terminal device is a trusted device. The first terminal device negotiates with the third terminal device about a communication port, and establishes a secure transmission channel based on the negotiated communication port. The first terminal device negotiates with the third terminal device about a security parameter that needs to be used on the secure transmission channel. The security parameter includes a communications protocol version and an encryption algorithm.

The first terminal device may obtain the communication link information from a storage area used to store the communication link information, or may pop up a dialog box to prompt the user to select the communication link information, and the user may search for or select the communication link information by using an interactive interface. After the communication link information is obtained, the communication link information is sent to the third terminal device through the secure transmission channel by using the negotiated communications protocol and the short-range wireless communication technology. In this way, after receiving the communication link information, the third terminal device establishes the communication connection to the second terminal device by using the communication link information when detecting the second terminal device.

It may be understood that, when the third terminal device can be connected to the wireless local area network, the short-range wireless communication technology may be NFC communication, Bluetooth communication, or Wi-Fi.

Further, when the third terminal device is in an offline state, the short-range wireless communication technology is NFC or Bluetooth communication. In this case, the first terminal device and the third terminal device may share a file in an offline state, so that the user can implement data sharing between terminals when no network is available.

Further, when the second terminal device is a terminal device that completes pairing with the first terminal device in advance, the communication link information includes Bluetooth pairing information used for pairing with the second terminal device. In this way, after receiving the Bluetooth pairing information, the third terminal device can perform Bluetooth pairing with the second terminal device by using the Bluetooth pairing information when detecting the second terminal device.

Further, the communication link information may further include access information of a wireless network and/or NFC access control identification information.

It may be understood that, when the first terminal device currently establishes a communication connection to the third terminal device, default communication link information is communication link information used to establish the communication connection to the third terminal device.

The communication link information may include communication link information corresponding to all third terminal devices currently or previously connected to the first terminal device, for example, communication link information corresponding to all wireless access points, personal hotspots, or routers that have been connected to the first terminal device.

The communication link information may be stored in a configuration file of a wireless network adapter management program in the first terminal device. For example, a storage path of the communication link information may be/data/misc/wifi/wpa_supplicant.conf.

For example, in the application scenario shown in FIG. 2, the mobile phone 100 sends the Bluetooth pairing information used for pairing with the Bluetooth headset 200 to the smartwatch 400 through an established secure transmission channel by using a negotiated communications protocol. In this way, when receiving the Bluetooth pairing information, the smartwatch 400 searches for the Bluetooth headset 200 based on the ID of the Bluetooth headset included in the Bluetooth pairing information, and when the Bluetooth headset 200 is found, establishes the communication connection to the Bluetooth headset 200 based on a pairing link between the Bluetooth headset and the mobile phone and a pairing key used during Bluetooth pairing.

When establishing a secure transmission channel between the mobile phone 100 and the notebook computer 300, the mobile phone 100 may also obtain the Bluetooth pairing information used for pairing with the Bluetooth headset 200 from a local database, and send the Bluetooth pairing information to the notebook computer 300 through the secure transmission channel between the mobile phone 100 and the notebook computer 300 by using a negotiated communications protocol. In this way, when receiving the Bluetooth pairing information, the notebook computer 300 searches for the Bluetooth headset 200 based on the ID of the Bluetooth headset included in the Bluetooth pairing information. When the Bluetooth headset 200 is found, the notebook computer 300 establishes the communication connection to the Bluetooth headset 200 based on the pairing link between the Bluetooth headset and the mobile phone and the pairing key used during Bluetooth pairing.

In this case, the user does not need to search for the ID of the Bluetooth headset and enter a pairing password on the smartwatch 400 and the notebook computer 300, and the smartwatch 400 and the notebook computer 300 can be automatically connected to the Bluetooth headset 200.

For another example, in the application scenario shown in FIG. 4, when establishing a secure transmission channel used to perform data exchange with the mobile phone 600, the mobile phone 100 sends the Wi-Fi access information to the mobile phone 600 through the secure transmission channel between the mobile phone 100 and the mobile phone 600 by using a negotiated communications protocol. In this way, after receiving the Wi-Fi access information, the mobile phone 600 accesses the wireless router 500 based on the obtained SSID and the access password when detecting the wireless router 500.

In this case, when the user does not enter the Wi-Fi access password, the mobile phone 500 may still be automatically connected to a wireless router, a wireless access point, or a personal hotspot that has been connected to the mobile phone 100 before.

It may be understood that after the first terminal device establishes the communication connection to the third terminal device, the third terminal device may also send, to the first terminal device, information that needs to be shared.

In the foregoing solution, after the first terminal device establishes the communication connection to the second terminal device, when the first terminal device approaches the third terminal device, the first terminal device can quickly and conveniently establish the communication connection to the third terminal device, and further share the communication link information, so that the third terminal device uses the communication link information to establish the communication connection to the second terminal device when detecting the second terminal device. The third terminal device can establish the communication connection to the second terminal device without requiring another device to participate in data exchange and without requiring the user to control the third terminal device. This may simplify an operation step of establishing the communication connection between the third terminal device and the second terminal device, thereby further improving efficiency of establishing communication connections among at least three terminal devices. The first terminal device and the third terminal device may share the file in the offline state, so that the user can implement data sharing between terminals when no network is available.

Figure 7:
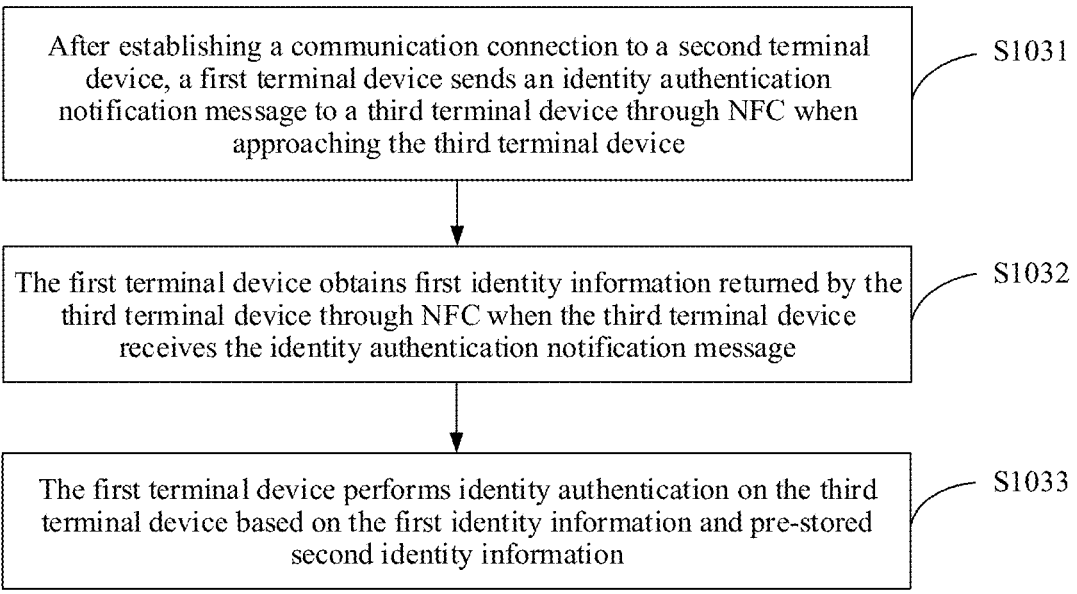
FIG. 7 is a detailed flowchart of S101 in an information sharing method according to an embodiment of this application.

Further, in another embodiment, S101 in FIG. 1 is refined. FIG. 7 is a detailed flowchart of S101 in the information sharing method according to an embodiment of this application. S101 may include S1031 to S1033, which are as follows:

S1031: After establishing the communication connection to the second terminal device, the first terminal device sends an identity authentication notification message to the third terminal device through NFC when approaching the third terminal device.

S1032: The first terminal device obtains first identity information returned by the third terminal device through NFC when the third terminal device receives the identity authentication notification message.

S1033: The first terminal device performs identity authentication on the third terminal device based on the first identity information and pre-stored second identity information.

For example, after establishing the communication connection to the second terminal device, the first terminal device may send the identity authentication notification message to the third terminal device by using the NFC technology when approaching the third terminal device, to indicate the third terminal device to return, when receiving the identity authentication notification message, the first identity information of the third terminal device to the first terminal device based on a device identifier of the first terminal device included or carried in the identity authentication notification message. When obtaining the first identity information sent by the third terminal device, the first terminal device searches the pre-stored second identity information in the identity information database for identity information that matches the identity information sent by the third terminal device, and when the matched identity information is found, determines that an identity authentication result of the third terminal device is that authentication succeeds, or when the matched identity information is not found, determines that an identity authentication result of the third terminal device is that authentication fails.

Further, the first identity information may include a first device identifier and a first public key of the third terminal device.

Further, the first identity information may include a first device identifier of the third terminal device, a first version number of a public key attribute credential of the third terminal device, and a first random number generated by the third terminal device. The first random number may be generated by the third terminal device when the third terminal device receives the identity authentication notification message sent by the first terminal device, or may be generated in advance. This is not limited herein.

Further, in an implementation, when the first identity information includes the first device identifier and the first public key of the third terminal device, S1033 is that the first terminal device obtains, from the identity database based on the first device identifier, a pre-stored public key corresponding to the third terminal device; performs identity authentication on the third terminal device based on the first public key and the pre-stored public key; and when the first public key is the same as the pre-stored public key, determines that the identity of the third terminal device is valid.

Specifically, when the pre-stored public key corresponding to the third terminal device is found, the first terminal device compares the first public key in the first identity information with the obtained pre-stored public key, so as to perform identity authentication on the third terminal device. When a comparison result is that the first public key is the same as the pre-stored public key, the first terminal device determines that the identity of the third terminal device is valid. When a comparison result is that the first public key is different from the pre-stored public key, the first terminal device determines that the identity of the third terminal device is invalid.

Further, in another implementation, the first identity information includes the first device identifier of the third terminal device, the first version number of the public key attribute credential, and the first random number generated by the third terminal device. A version number of the public key attribute credential is mainly used to determine whether the third terminal device is revoked (removed from a trust chain) or the third terminal device is a device that newly joins the trust chain. In this way, an offline device may also be relatively secure, and validity of a certificate of each device does not need to be confirmed online at any time. S1033 includes the following steps.

S1: The first terminal device obtains the first public key of the third terminal device based on the first device identifier and the first version number.

The first terminal device may search the local database for a device identifier that matches the first device identifier; when the matched device identifier is found, obtain a second version number of the public key attribute of the third terminal device from the local database based on the first device identifier; and determine, based on a comparison result, whether currently the first public key of the third terminal device is obtained locally or the third terminal device is requested to return the first public key. When the first version number is less than or equal to the first version number, the first public key of the third terminal device is locally obtained. When the first version number is greater than the first version number, the third terminal device is requested to return the first public key.

In this embodiment, it is determined whether the third terminal device is a newly added trusted device by searching for the device identifier that matches the first device identifier, and it is determined whether a trusted qualification of the third terminal device is revoked by comparing the first version number and the second version number of the public key attribute credential. In this way, the offline device is also relatively secure, and the validity of the public key of each device does not need to be confirmed online at any time.

When the matched device identifier is not found, the third terminal device is a newly added trusted device. When the first version number is less than the second version number, and the matched device identifier is not found, the trusted qualification of the third terminal device is revoked.

Further, S1 includes: The first terminal device searches the identity database for the device identifier that matches the first device identifier; and when the matched device identifier is found, and the first version number is less than or equal to the pre-stored second version number of the public key attribute credential, obtains the public key of the third terminal device from the identity database, or when the matched device identifier is not found, and the first version number is greater than the pre-stored second version number of the public key attribute credential, requests to obtain the first public key from the third terminal device.

It may be understood that when the matched device identifier is not found, and the first version number is less than the pre-stored second version number of the public key attribute credential, it is determined that the identity of the third terminal device is invalid.

S2: The first terminal device calculates a first shared key based on a private key of the first terminal device and the first public key, and generates a second random number.

The first terminal device may obtain the shared key through calculation by using a message digest algorithm based on the private key of the first terminal device and the first public key of the third terminal device. Alternatively, hash values of the private key of the first terminal device and the first public key of the third terminal device may be calculated by using a hash algorithm, to obtain the shared key. The shared key may alternatively be calculated by using another algorithm. A manner of calculating the shared key is not limited herein.

S3: The first terminal device calculates a first identity feature value based on the first shared key, a second device identifier of the first terminal device, the first random number, and the second random number.

The first terminal device may combine the first shared key, the second device identifier of the first terminal device, the first random number, and the second random number into one message, and calculate a digest value of the message by using the message digest algorithm, to obtain the first identity feature value.

Alternatively, the first terminal device may calculate a message authentication code (MAC) value of the message by using the shared key, to obtain the first identity feature value.

Specifically, the first terminal device may use the device ID of the first terminal device, the first random number, and the second random number as a message M, calculate a digest value of the message M by using the message digest algorithm, and calculate a MAC value based on the digest value and the shared key. Alternatively, the first terminal device calculates the MAC value of the message M by using a message authentication algorithm with participation of the shared key. For example, the digest value of the message M is encrypted by using the shared key, to obtain the MAC value, or the message M is encrypted by using the shared key, to obtain the MAC value.

S4: The first terminal device sends the first identity feature value, the second device identifier of the first terminal device, the second version number of the public key attribute credential, and the second random number to the third terminal device through near field communication.

S5: The first terminal device receives a second identity feature value returned by the third terminal device, where the second identity feature value is obtained through calculation by the third terminal device based on a second shared key, the second device identifier, the first random number, and the second random number when the third terminal device obtains the second shared key through calculation; and the second shared key is obtained through calculation based on a private key of the third terminal device and a public key of the first terminal device.

A method for calculating the shared key by the third terminal device is the same as the method for calculating the shared key by the first terminal device, and a method for calculating the second identity feature value by the third terminal device is the same as the method for calculating the first identity feature value by the first terminal device. Details are not described herein again.

S6: When determining that the first identity feature value is the same as the second identity feature value, the first terminal device determines that the identity of the third terminal device is valid.

The following describes an identity authentication process in detail with reference to an interaction diagram of an identity authentication method. The details are as follows:

Before S1, the first terminal device and the third terminal device send the public keys of the first terminal device and the third terminal device to a server by logging in to a same user account to perform registration. When the third terminal device is in a network disconnection state and the first terminal device detects the third terminal device through NFC, the first terminal device performs identity authentication on the third terminal device based on the public key of the third terminal device.

Figure 8:
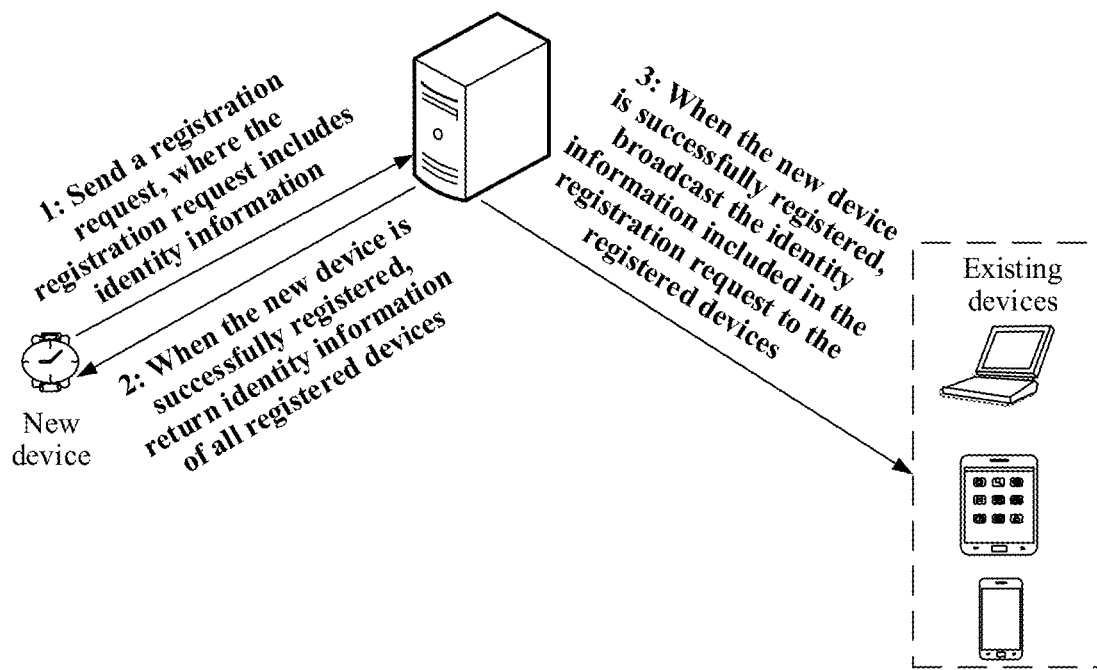
FIG. 8 is a schematic diagram of a scenario of a trust chain registration method according to an embodiment of this application.

Specifically, FIG. 8 is a schematic diagram of a scenario of a trust chain registration method according to an embodiment of this application. In FIG. 8, a notebook computer, a tablet computer, and a mobile phone are devices that have logged in to a same user account and successfully registered by sending public keys of the notebook computer, the tablet computer, and the mobile phone to a server, that is, have joined a trust chain. A smartwatch is a device that does not join the trust chain.

Because each terminal device may have a public-private key pair, when the user purchases a new terminal device (for example, a smartwatch), the smartwatch may be triggered to generate a public-private key pair by using the asymmetric encryption algorithm. The user operates the new smartwatch to enter an account login interface, and enters a user account and a login password on the account login interface to send a login request to the server. When receiving the login request, the server checks, based on a registration account and a registration password that are stored in the database, whether the user account and the login password in the login request are correct, and allow the smartwatch to log in and establish a communication connection to the smartwatch when determining that the user account and the login password in the login request are correct. In this case, the smartwatch may display an interactive interface indicating successful login. The user may operate the smartwatch to enter an interactive interface used to register the trust chain. The user may enter or select a public key of the smartwatch by using the interactive interface, and tap a "registration" option, to trigger the smartwatch to send a registration request to the server. The registration request includes a device identifier of the smartwatch and the public key thereof.

When receiving the registration request, the server parses out the device identifier and the public key that are included in the registration request, establishes an association between the device identifier and the public key, adds the smartwatch to the trust chain, returns device identifiers and public keys of existing devices in the trust chain to the smartwatch, and then broadcasts the device identifier and the public key of the smartwatch to the existing devices in the trust chain, to notify the existing devices in the trust chain that a new device currently joins the trust chain, so as to indicate the existing devices in the trust chain to store the device identifier and the public key of the smartwatch. In this way, each device that joins the trust chain locally stores device identifiers and public keys of all devices that have joined the trust chain.

Figure 9A:
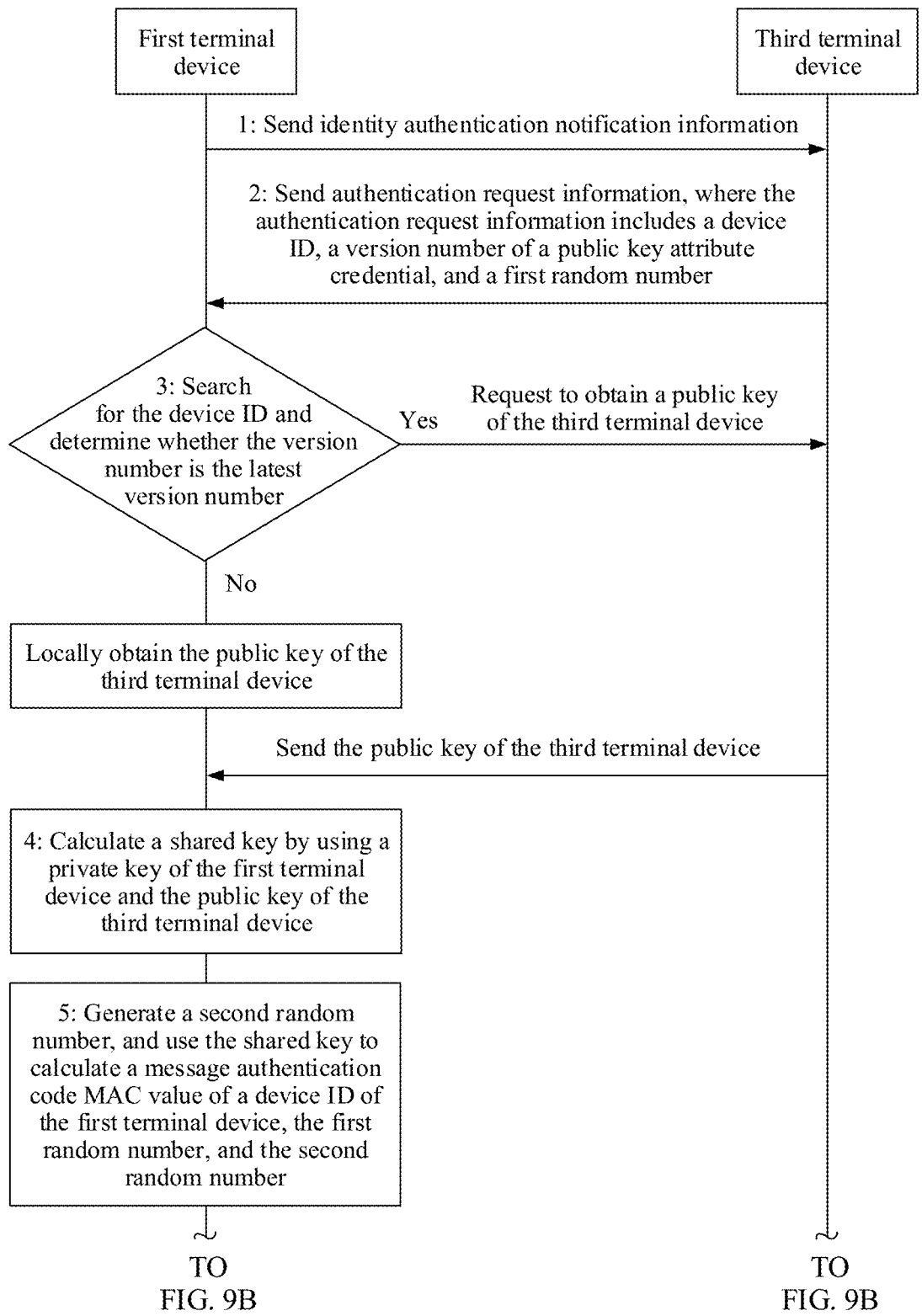
FIG. 9A and FIG. 9B are an interaction diagram of an identity authentication method according to an embodiment of this application.
Figure 9B:
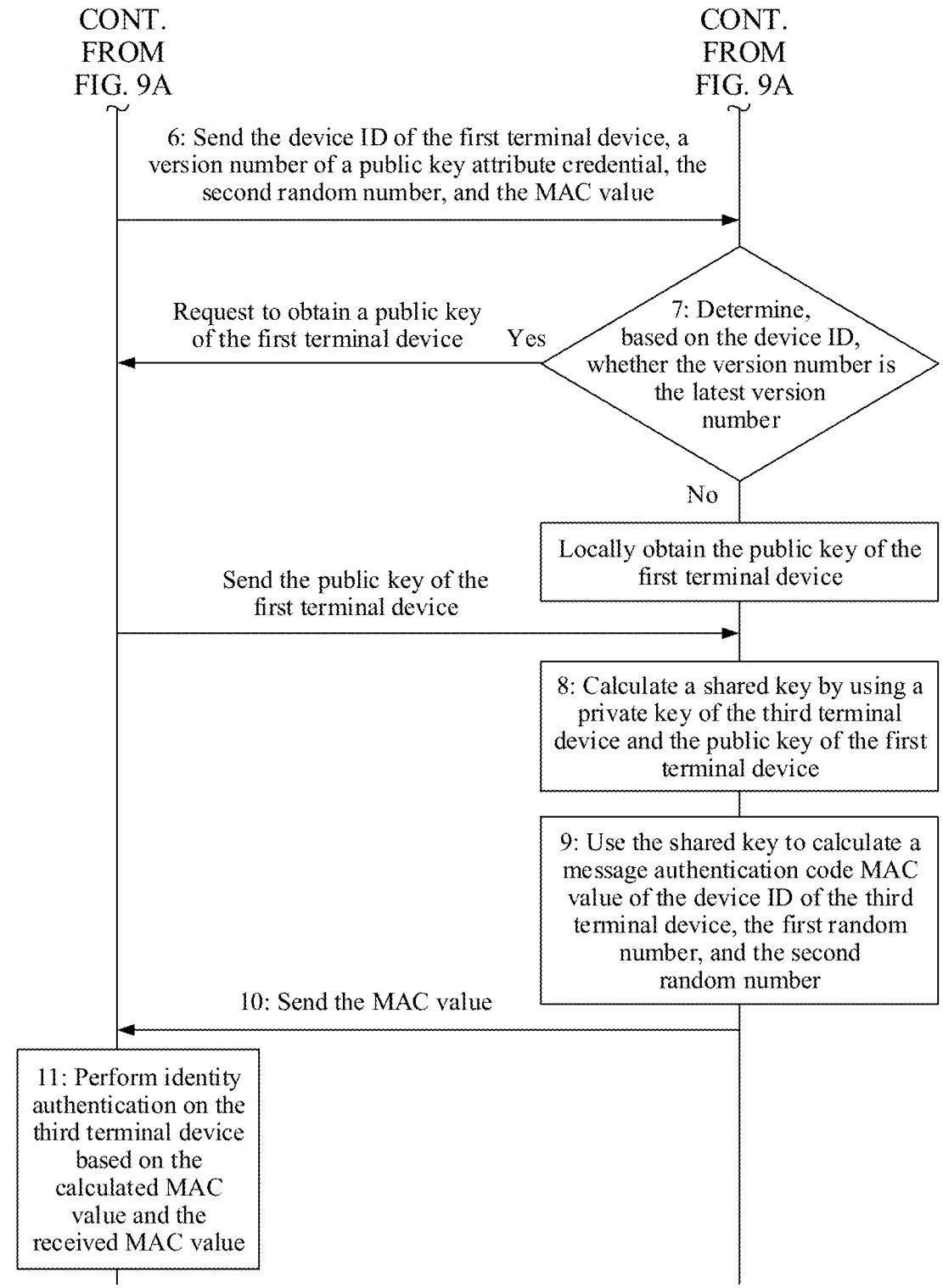

FIG. 9A and FIG. 9B are an interaction diagram of an identity authentication method according to an embodiment of this application. The first terminal device performs identity authentication on the third terminal device in the following manners.

1. When detecting the third terminal device, the first terminal device may send the identity authentication notification message to the third terminal device by using the NFC technology.

2. When receiving the identity authentication notification message, the third terminal device sends authentication request information to the first terminal device, where the authentication request information includes the device ID of the third terminal device, the version number of the public key attribute credential of the third terminal device, and the first random number generated by the third terminal device.

3. When receiving authentication request information sent by the third terminal device, the first terminal device parses the authentication request information to obtain the device ID of the third terminal device, the version number of the public key attribute credential of the third terminal device, and the first random number generated by the third terminal device; and performs the following steps in a local public key directory:

(a) searching for the device ID of the third terminal device, and comparing a version number stored in the local public key directory with the version number sent by the third terminal device, that is, comparing the received version number of the public key attribute credential (the first version number of the public key attribute credential sent by the third terminal device) with the locally stored version number (the locally stored second version number of the public key attribute credential corresponding to the third terminal device), to determine whether the version number of the received public key attribute credential is the latest version number, where the version number is mainly used to determine whether the third terminal device is revoked (removed from the trust chain) or the third terminal device is a device that newly joins the trust chain, and in this way, the offline device may also be relatively secure, and validity of the certificate of each device does not need to be confirmed online at any time; and (b) performing processing based on a search result and a comparison result according to a processing policy in the following table, to obtain the public key of the third terminal device.

When the device ID of the third terminal device is not found, and the locally stored version number is less than the version number sent by the third terminal device, it is determined that the third terminal device is a device that newly joins the trust chain, and the public key and the public key attribute credential of the third terminal device that are stored in the local public key directory are of old versions. Public key obtaining request information is sent to the third terminal device, to request to obtain the public key and the public key attribute credential of the third terminal device.

When the device ID of the third terminal device is not found, and the locally stored version number is greater than the version number sent by the third terminal device, it is determined that locally stored data is of the latest version, data of the third terminal device is no longer in the local public key directory after the last update of the local public key directory, and the trust qualification of the third terminal device is revoked. In this case, the first terminal device determines that the third terminal device is untrusted, and refuses to connect to the third terminal device.

When the device ID of the third terminal device is found, and the locally stored version number is greater than the version number sent by the third terminal device, it is determined that the data stored in the local public key directory is of the latest version, and identity authentication is performed on the third terminal device by using the public key of the third terminal device stored in the local public key directory. The public key of the third terminal device is obtained from the local public key directory, and the third terminal device does not need to send the public key and the public key attribute credential.

| Compare a received version number with a locally stored version number | Check whether a received device ID exists | Processing method |
| --- | --- | --- |
| The received version number is greater than the locally stored version number | No | Require a peer device to send a public key and a public key attribute credential |
| The received version number is less than the locally stored version number | No | A connection is rejected, and an authentication result is that the peer device is untrusted |
| The received version number is less than the locally stored version number | Yes | The public key in the local directory is used, and the peer device does not need to send the public key and the public key attribute credential |

4. When the first terminal device obtains the public key of the third terminal device, the first terminal device calculates the shared key by using the private key of the first terminal device and the public key of the third terminal device. It may be understood that the first terminal device may obtain the shared key through calculation by using the message digest algorithm based on the private key of the first terminal device and the public key of the third terminal device. Alternatively, the hash values of the private key of the first terminal device and the public key of the third terminal device may be calculated by using the hash algorithm, to obtain the shared key. The shared key may alternatively be calculated by using another algorithm. A manner of calculating the shared key is not limited herein.

5. The first terminal device generates the second random number, and uses the shared key to calculate a message authentication code (MAC) value corresponding to the device ID of the first terminal device, the first random number generated by the third terminal device, and the second random number generated by the first terminal device.

Specifically, the first terminal device may use the device ID of the first terminal device, the first random number, and the second random number as the message M, calculate the digest value of the message M by using the message digest algorithm, and calculate the MAC value based on the digest value and the shared key. Alternatively, the first terminal device calculates the MAC value of the message M by using the message authentication algorithm with participation of the shared key. For example, the digest value of the message M is encrypted by using the shared key, to obtain the MAC value, or the message M is encrypted by using the shared key, to obtain the MAC value.

6. The first terminal device sends the device ID of the first terminal device, a version number of a public key attribute credential of the first terminal device, and the second random number to the third terminal device by using the NFC technology. It may be understood that, when the third terminal device needs to perform identity authentication on the first terminal device, the first terminal device may further send the calculated MAC value to the third terminal device, so that the third terminal device verifies the MAC value by using the shared key when calculating the shared key, so as to perform identity authentication on the first terminal device.

7. When obtaining the device ID of the first terminal device and the version number of the public key attribute credential, the third terminal device performs the following processing:

searching for the device ID of the first terminal device, comparing a locally stored version number with the version number sent by the first terminal device, and performing processing based on a search result and a comparison result according to the processing policy in the foregoing table.

When the device ID of the first terminal device is not found, and the locally stored version number is less than the version number sent by the first terminal device, it is determined that the first terminal device is a device that newly joins the trust chain, and a public key and a public key attribute credential of the first terminal device that are stored in a local public key directory are of old versions. Public key obtaining request information is sent to the first terminal device, to request to obtain the public key and the public key attribute credential of the first terminal device.

When the device ID of the first terminal device is not found, and the locally stored version number is greater than the version number sent by the first terminal device, it is determined that data stored in the local public key directory is of the latest version, data of the first terminal device is no longer in the local public key directory after the last update of the local public key directory, and a trust qualification of the first terminal device is revoked. In this case, the third terminal device determines that the first terminal device is untrusted, and refuses to connect to the first terminal device.

When the device ID of the first terminal device is found, and the locally stored version number is greater than the version number sent by the first terminal device, it is determined that the data stored in the local public key directory is of the latest version, and identity authentication is performed on the first terminal device by using the public key of the first terminal device stored in the local public key directory. The public key of the first terminal device is obtained from the local public key directory, and the first terminal device does not need to send the public key and the public key attribute credential.

8. When the third terminal device obtains the public key of the first terminal device, the third terminal device calculates a shared key by using the private key of the third terminal device and the public key of the first terminal device. It may be understood that the third terminal device may obtain the shared key through calculation by using the message digest algorithm based on the private key of the third terminal device and the public key of the first terminal device. Alternatively, hash values of the private key of the third terminal device and the public key of the first terminal device may be calculated by using the hash algorithm, to obtain the shared key. The shared key may alternatively be calculated by using another algorithm. A manner of calculating the shared key is not limited herein. Because elliptic curve Diffie-Hellman (ECDH) has interchangeability, the shared keys obtained through calculation by the first terminal device and the third terminal device are the same.

9. The third terminal device uses the shared key to calculate the MAC value corresponding to the device ID of the first terminal device, the first random number generated by the third terminal device, and the second random number generated by the first terminal device.

10. The calculated MAC value is sent to the first terminal device by using the NFC technology.

A method for calculating the message authentication code (MAC) value by the third terminal device is the same as a method for calculating the message authentication code (MAC) value by the first terminal device. For details, refer to the descriptions of calculating the message authentication code (MAC) value by the first terminal device. Details are not described herein again.

Optionally, when receiving the MAC value sent by the first terminal device, the third terminal device may verify the MAC value sent by the first terminal device by using the shared key, so as to perform identity authentication on the first terminal device.

For example, when the MAC value sent by the first terminal device is obtained by encrypting the device ID of the first terminal device, the first random number, and the second random number by using the shared key, the third terminal device may use the calculated shared key to decrypt the MAC value sent by the first terminal device. If the device ID of the first terminal device, the first random number, and the second random number are obtained through decryption, it is determined that an identity of the first terminal device is valid, and the identity authentication succeeds. If data obtained through decryption is different from any one of the device ID of the first terminal device, the first random number, or the second random number, it is determined that an identity of the first terminal device is invalid, and the identity authentication fails.

For another example, when the MAC value sent by the first terminal device is obtained by encrypting a digest value by using the shared key (where the digest value is obtained through calculation based on the device ID of the first terminal device, the first random number, and the second random number), the third terminal device may use the calculated shared key to decrypt the MAC value sent by the first terminal device, to obtain a digest value through decryption; and calculate the digest value corresponding to the device ID of the first terminal device, the first random number, and the second random number by using the message digest algorithm. If the digest value obtained through decryption is the same as the digest value obtained through calculation, it is determined that an identity of the first terminal device is valid, and the identity authentication succeeds. If the digest value obtained through decryption is different from the digest value obtained through calculation, it is determined that an identity of the first terminal device is invalid, and the identity authentication fails.

11. When receiving the MAC value sent by the third terminal device, the first terminal device compares the received MAC value with the MAC value sent to the third terminal device. When the two values are the same, it is determined that the identity of the third terminal device is valid, and the identity authentication succeeds. When the two values are different, it is determined that the identity of the third terminal device is invalid, and the identity authentication fails.

For ease of understanding, the following describes the foregoing processes with reference to specific application scenarios, and details are as follows:

Still refer to FIG. 2. In FIG. 2, the mobile phone 100 is a first terminal device, the Bluetooth headset 200 is an accessory device, and the notebook computer 300 and the smartwatch 400 are third terminal devices.

In an application scenario, it is assumed that when going to work in the morning, the user carries the mobile phone 100, the Bluetooth headset 200, and the smartwatch 400, but the notebook computer 300 of the user is at home. Neither the smartwatch 400 nor the notebook computer 300 accesses the Internet, that is, the smartwatch 400 and the notebook computer 300 are in a network disconnection state. The mobile phone 100, the smartwatch 400, and the notebook computer 300 all complete registration with a server by logging in to a same user account in advance (where for details about the registration process, refer to FIG. 8 and related descriptions of the registration process in FIG. 8). In other words, the mobile phone 100, the smartwatch 400, and the notebook computer 300 all join a trust chain. The mobile phone 100 pre-stores identity information of the smartwatch 400 and the notebook computer 300, the smartwatch 400 pre-stores identity information of the mobile phone 100 and the notebook computer 300, and the notebook computer 300 pre-stores identity information of the mobile phone 100 and the smartwatch 400. A public key is used as an example to describe the identity information.

On the way home from work, when the user wants to listen to music by using the Bluetooth headset, the user enables a Bluetooth function of the mobile phone 100 by using the interactive interface of the mobile phone 100, and searches for a Bluetooth device. When the interactive interface of the mobile phone 100 displays the found ID of the Bluetooth headset 200, the ID is tapped to trigger the mobile phone 100 to connect to the Bluetooth headset 200. Then, a pairing key is entered on a pairing interface popped up by the mobile phone 100, and "confirm" is tapped to establish a pairing connection, so that the mobile phone 100 is paired with the Bluetooth headset 200, and a communication connection is established.

After the mobile phone 100 establishes the communication connection to the Bluetooth headset 200, the user may move the mobile phone 100 close to the smartwatch 400. In this case, the mobile phone 100 may detect, by using the Bluetooth communication technology, whether a connectable Bluetooth device exists within a communication range of the mobile phone 100, so as to detect another connectable Bluetooth device carried by the user. When detecting the smartwatch 400 that is carried by the user and whose Bluetooth function is enabled, the mobile phone 100 communicates with the smartwatch 400 by using the NFC technology, and performs identity authentication on the smartwatch 400. It may be understood that, in another embodiment, the mobile phone 100 may detect, by using the NFC technology, whether a connectable device supporting NFC communication exists in the communication range of the mobile phone 100.

When detecting the connectable smartwatch 400 currently carried by the user, the mobile phone 100 may remind the user by using a text or voice message that the connectable smartwatch is currently detected, and the mobile phone 100 may send an identity authentication notification message to the smartwatch 400 by using the NFC technology, to indicate the smartwatch 400 to send authentication request information to the mobile phone 100 when receiving the identity authentication notification message. The authentication request information includes the device ID of the smartwatch 400, a version number of a public key attribute credential of the smartwatch 400, and a first random number generated by the smartwatch 400.

When receiving the authentication request information sent by the smartwatch 400, the mobile phone 100 parses out the device ID of the smartwatch 400, the version number of the public key attribute credential of the smartwatch 400, and the first random number in the authentication request information.

The mobile phone 100 searches a local public key database for the device ID of the smartwatch 400, and compares a version number of a locally stored public key attribute credential with the version number of the public key attribute credential sent by the smartwatch 400. The mobile phone obtains a public key of the smartwatch 400 in the following manner based on a search result and a comparison result.

When the device ID of the smartwatch 400 is not found, and the locally stored version number is less than the version number sent by the smartwatch 400, the mobile phone 100 determines that the smartwatch 400 is a device that newly joins the trust chain, and sends public key obtaining request information to the smartwatch 400, to request to obtain the public key and the public key attribute credential of the smartwatch 400.

When the device ID of the smartwatch 400 is found, and the locally stored version number is greater than the version number sent by the smartwatch 400, the mobile phone 100 determines that data stored in a local directory is of the latest version, and performs identity authentication on the third terminal device by using a locally stored public key of the smartwatch 400. The public key of the smartwatch 400 is locally obtained, and the smartwatch 400 does not need to send the public key and the public key attribute credential.

It may be understood that, when the device ID of the smartwatch 400 is not found, and the locally stored version number is greater than the version number sent by the smartwatch 400, the mobile phone 100 determines that the data stored in the local directory is of the latest version, data of the smartwatch 400 is no longer in the local directory after the last update of the local directory, and a trust qualification of the smartwatch 400 is revoked. In this case, the mobile phone 100 determines that the smartwatch 400 is untrusted, and identity authentication performed on the smartwatch 400 fails. The mobile phone 100 refuses to connect to the smartwatch 400.

When the mobile phone 100 obtains the public key of the smartwatch 400, the mobile phone 100 calculates a shared key by using a private key of the mobile phone 100 and the public key of the smartwatch 400. It may be understood that the mobile phone 100 may obtain the shared key through calculation by using the message digest algorithm based on the private key of the mobile phone 100 and the public key of the smartwatch 400. Alternatively, hash values of the private key of the mobile phone 100 and the public key of the smartwatch 400 may be calculated by using the hash algorithm, to obtain the shared key. The shared key may alternatively be calculated by using another algorithm. A manner of calculating the shared key is not limited herein.

The mobile phone 100 generates a second random number, and uses the shared key to calculate a MAC value corresponding to the device ID of the mobile phone 100, the first random number generated by the smartwatch 400, and the second random number generated by the mobile phone 100.

Specifically, the mobile phone 100 may use the device ID of the mobile phone 100, the first random number, and the second random number as a message M, calculate a digest value of the message M by using the message digest algorithm, and calculate a MAC value based on the digest value and the shared key. Alternatively, the mobile phone 100 calculates the MAC value of the message M by using the message authentication algorithm with participation of the shared key. For example, the digest value of the message M is encrypted by using the shared key, to obtain the MAC value, or the message M is encrypted by using the shared key, to obtain the MAC value.

The mobile phone 100 sends the device ID of the mobile phone 100, a version number of a public key attribute credential of the mobile phone 100, and the second random number to the smartwatch 400 by using the NFC technology. It may be understood that, when the smartwatch 400 needs to perform identity authentication on the mobile phone 100, the mobile phone 100 may further send the calculated MAC value to the smartwatch 400, so that when calculating the shared key, the smartwatch 400 verifies, by using the shared key, the MAC value sent by the mobile phone 100, so as to perform identity authentication on the mobile phone 100.

When obtaining the device ID of the mobile phone 100 and the version number of the public key attribute credential, the smartwatch 400 performs the following processing:

(a) The smartwatch 400 searches for the device ID of the mobile phone 100, and compares a locally stored version number with the version number sent by the mobile phone 100. Based on a search result and a comparison result, the public key of the mobile phone 100 is obtained in the following manners:

When the device ID of the mobile phone 100 is not found, and the locally stored version number is less than the version number sent by the mobile phone 100, the smartwatch 400 determines that the mobile phone 100 is a device that newly joins the trust chain, and a public key and a public key attribute credential of the mobile phone 100 that are stored in a local directory are of old versions; and sends public key obtaining request information to the mobile phone 100, to request to obtain the public key and the public key attribute credential of the mobile phone 100.

When the device ID of the mobile phone 100 is found, and the locally stored version number is greater than the version number sent by the mobile phone 100, the smartwatch 400 determines that data stored in the local directory is of the latest version, and performs identity authentication on the mobile phone 100 by using the public key of the mobile phone 100 stored in the local directory. The public key of the mobile phone 100 is obtained from the local directory, and the mobile phone 100 does not need to send the public key and the public key attribute credential.

When the device ID of the mobile phone 100 is not found, and the locally stored version number is greater than the version number sent by the mobile phone 100, the smartwatch 400 determines that the data stored in the local directory is of the latest version, data of the mobile phone 100 is no longer in the local directory after the last update of the local directory, and a trust qualification of the mobile phone 100 is revoked. In this case, the smartwatch 400 determines that the mobile phone 100 is untrusted, and identity authentication performed on the mobile phone 100 fails. The smartwatch 400 refuses to connect to the mobile phone 100.

(b) When the smartwatch 400 obtains the public key of the mobile phone 100, the smartwatch 400 calculates a shared key by using a private key of the smartwatch 400 and the public key of the mobile phone 100. It may be understood that the smartwatch 400 may obtain the shared key through calculation by using the message digest algorithm based on the private key of the smartwatch 400 and the public key of the mobile phone 100. Alternatively, hash values of the private key of the smartwatch 400 and the public key of the mobile phone 100 may be calculated by using the hash algorithm, to obtain the shared key. The shared key may alternatively be calculated by using another algorithm. A manner of calculating the shared key is not limited herein. Because the elliptic curve Diffie-Hellman (ECDH) has interchangeability, the shared keys obtained through calculation by the mobile phone 100 and the smartwatch 400 are the same.

(c) The smartwatch 400 uses the shared key to calculate a message authentication code (MAC) value corresponding to the device ID of the mobile phone 100, the first random number generated by the smartwatch 400, and the second random number generated by the mobile phone 100, and sends the calculated MAC value to the mobile phone 100 by using the NFC technology based on the device ID of the mobile phone 100.

A method for calculating the message authentication code (MAC) value by the smartwatch 400 is the same as a method for calculating the message authentication code (MAC) value by the mobile phone 100. For details, refer to the descriptions of calculating the message authentication code (MAC) value by the mobile phone 100. Details are not described herein again.

Optionally, when receiving the MAC value sent by the mobile phone 100, the smartwatch 400 may verify the MAC value sent by the mobile phone 100 by using the shared key, so as to perform identity authentication on the mobile phone 100.

For example, when the MAC value sent by the mobile phone 100 is obtained by encrypting the device ID of the mobile phone 100, the first random number, and the second random number by using the shared key, the smartwatch 400 may use the calculated shared key to decrypt the MAC value sent by the mobile phone 100. If the device ID of the mobile phone 100, the first random number, and the second random number are obtained through decryption, it is determined that an identity of the mobile phone 100 is valid, and the identity authentication succeeds. If data obtained through decryption is different from any one of the device ID of the mobile phone 100, the first random number, or the second random number, it is determined that an identity of the mobile phone 100 is invalid, and the identity authentication fails.

For another example, when the MAC value sent by the mobile phone 100 is obtained by encrypting a digest value by using the shared key (where the digest value is obtained through calculation based on the device ID of the mobile phone 100, the first random number, and the second random number), the smartwatch 400 may use the calculated shared key to decrypt the MAC value sent by the mobile phone 100, to obtain a digest value through decryption; and calculate the digest value corresponding to the device ID of the mobile phone 100, the first random number, and the second random number by using the message digest algorithm. If the digest value obtained through decryption is the same as the digest value obtained through calculation, it is determined that an identity of the mobile phone 100 is valid, and the identity authentication succeeds. If the digest value obtained through decryption is different from the digest value obtained through calculation, it is determined that an identity of the mobile phone 100 is invalid, and the identity authentication fails.

When receiving the MAC value sent by the smartwatch 400, the mobile phone 100 compares the received MAC value with the MAC value sent to the smartwatch 400. When the two values are the same, it is determined that an identity of the smartwatch 400 is valid, and the identity authentication succeeds, and S102 is performed. When the two values are different, it is determined that an identity of the smartwatch 400 is invalid, and the identity authentication fails.

It may be understood that, when completing identity authentication on the smartwatch 400, the mobile phone 100 may display an identity authentication result on the display interface, or broadcast the identity authentication result by using a voice.

In another application scenario, when the user comes home and the user approaches a location at which the notebook computer 300 is placed, the mobile phone 100 detects, by using the Bluetooth communication technology, whether a connectable Bluetooth device exists at home, or the mobile phone 100 detects, by using the NFC technology, whether a connectable NFC device exists near the mobile phone 100. When detecting the notebook computer 300 placed at home and whose Bluetooth function is enabled, the mobile phone 100 communicates with the notebook computer by using the NFC technology, and performs identity authentication on the notebook computer 300 according to the foregoing method.

In another application scenario, in FIG. 4, the mobile phone 100 is a first terminal device, the wireless router, the wireless access point, or the personal hotspot 500 is a third terminal device, and the mobile phone 600 is a third terminal device.

The mobile phone 600 is not connected to the wireless router 500 at the friend's house before. Therefore, when the mobile phone 100 is connected to the wireless router 500 at the friend's house, the user may move the mobile phone 100 close to the mobile phone 600. In this case, the mobile phone 100 detects, through Bluetooth communication or NFC, the mobile phone 300 whose short-range communication function is currently enabled. When the mobile phone 300 is detected, identity authentication is performed on the mobile phone 600 according to the foregoing method by using the NFC technology.

When determining that the identity of the third terminal device is valid, the first terminal device determines that the identity authentication succeeds, and performs S102. When it is determined that the identity of the third terminal device is invalid, the process ends.

Further, when the first terminal device generates a session key, S102 is: encrypting the communication link information by using the session key, and sending the encrypted communication link information to the third terminal device through the secure transmission channel.

Figure 10:
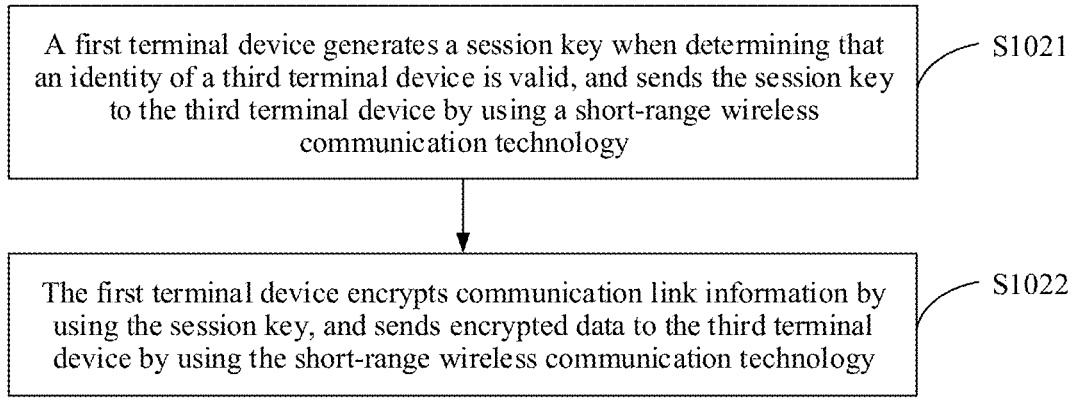
FIG. 10 is a detailed flowchart of S102 in an information sharing method according to an embodiment of this application.

Further, in another embodiment, S102 is refined. FIG. 10 is a detailed flowchart of S102 in the information sharing method according to an embodiment of this application. To improve security of data transmitted through the secure transmission channel, S102 includes S1021 and S1022, which are as follows:

S1021: The first terminal device generates the session key when determining that the identity of the third terminal device is valid, and sends the session key to the third terminal device by using the short-range wireless communication technology.

S1022: The first terminal device encrypts the communication link information by using the session key, and sends encrypted data to the third terminal device by using the short-range wireless communication technology.

In S1021, when determining that the identity of the third terminal device is valid, the first terminal device generates the session key, establishes the secure transmission channel to the third terminal device, and sends the session key to the third terminal device through the secure transmission channel. The session key is used to encrypt or decrypt the data transmitted through the secure transmission channel by using a negotiated encryption algorithm.

The first terminal device obtains the communication link information from the storage area used to store the communication link information, encrypts the communication link information by using the negotiated encryption algorithm and the session key, and sends the encrypted communication link information to the third terminal device through the secure transmission channel.

In an implementation, the first terminal device may randomly generate the session key by using the public key of the third terminal device.

In another implementation, the first terminal device may generate the session key based on the shared key obtained through calculation in S101, a fixed derivation factor, the first random number generated by the third terminal device, and the second random number generated by the first terminal device. The fixed derivation factor is a fixed random number used to identify an authentication service. A length of the fixed random number may be 8 bytes, but is not limited thereto, and may be set to another length based on an actual requirement. The authentication service includes but is not limited to fast file transfer, fast hotspot sharing, a shared communication link, short message forwarding, and a call relay.

A method in which the first terminal device generates the session key based on the shared key, the fixed derivation factor, the first random number, and the second random number may be: A digest value of a message including the shared key, the fixed derivation factor, the first random number, and the second random number is calculated by using the message digest algorithm, and the digest value is used as the session key. Alternatively, with participation of the shared key, a MAC value of a message including the shared key, the fixed derivation factor, the first random number, and the second random number is calculated by using the message authentication algorithm, and the MAC value is used as the session key. It may be understood that the first terminal device may alternatively generate the session key by using another algorithm. This is not limited herein.

The following describes an information sharing process with reference to specific application scenarios.

For example, in the application scenario shown in FIG. 2, when determining that the smartwatch 400 is trusted, the mobile phone 100 generates a session key, establishes the secure transmission channel used to perform data exchange with the smartwatch 400, and sends the session key to the smartwatch 400 through the secure transmission channel. The mobile phone 100 obtains the Bluetooth pairing information used for pairing with the Bluetooth headset 200 from the local database. The Bluetooth pairing information includes at least the ID of the Bluetooth headset, the pairing link between the Bluetooth headset and the mobile phone, and the pairing key used during Bluetooth pairing. Then, the mobile phone 100 encrypts the to-be-shared Bluetooth pairing information by using the session key based on a negotiated encryption algorithm, and sends the encrypted Bluetooth pairing information to the smartwatch 400 through the established secure transmission channel by using the negotiated communications protocol. In this way, when receiving the encrypted Bluetooth pairing information, the smartwatch 400 decrypts the encrypted Bluetooth pairing information by using the session key, to obtain the Bluetooth pairing information; searches for the Bluetooth headset 200 based on the ID of the Bluetooth headset included in the Bluetooth pairing information; and when the Bluetooth headset 200 is found, establishes the communication connection to the Bluetooth headset 200 based on the pairing link between the Bluetooth headset and the mobile phone and the pairing key used during Bluetooth pairing.

When determining that the notebook computer 300 is trusted, the mobile phone 100 establishes the secure transmission channel used to perform data exchange with the mobile phone 200, and sends the session key to the notebook computer 300 through the secure transmission channel. The secure transmission channel is used by the mobile phone 100 to send the encrypted Bluetooth pairing information to the notebook computer 300. The mobile phone 100 obtains the Bluetooth pairing information used for pairing with the Bluetooth headset 200 from the local database, encrypts the to-be-shared Bluetooth pairing information by using the session key based on the negotiated encryption algorithm, and sends the encrypted Bluetooth pairing information to the notebook computer 300 through the secure transmission channel with the notebook computer 300 by using the negotiated communications protocol. In this way, when receiving the encrypted Bluetooth pairing information, the notebook computer 300 decrypts the encrypted Bluetooth pairing information by using the session key, to obtain the Bluetooth pairing information; searches for the Bluetooth headset 200 based on the ID of the Bluetooth headset included in the Bluetooth pairing information; and when the Bluetooth headset 200 is found, establishes the communication connection to the Bluetooth headset 200 based on the pairing link between the Bluetooth headset and the mobile phone and the pairing key used during Bluetooth pairing.

In this case, the user does not need to search for the ID of the Bluetooth headset and enter the pairing password on the smartwatch 400 and the notebook computer 300, and the smartwatch 400 and the notebook computer 300 can be automatically connected to the Bluetooth headset 200.

For another example, in the application scenario shown in FIG. 4, when determining that the mobile phone 600 is trusted, the mobile phone 100 generates a session key, establishes the secure transmission channel used to perform data exchange with the mobile phone 600, and sends the session key to the mobile phone 600 through the secure transmission channel. The mobile phone 100 obtains the Wi-Fi access information from the local database. The Wi-Fi access information is used to access the router 500 (or the personal hotspot or the wireless access point), and the Wi-Fi access information includes at least the SSID and the access password. The mobile phone 100 encrypts the to-be-shared Wi-Fi access information by using the session key, and sends the encrypted Wi-Fi access information to the mobile phone 600 through the secure transmission channel between the mobile phone 100 and the mobile phone 600. In this way, when receiving the encrypted Wi-Fi access information, the mobile phone 600 decrypts the encrypted Wi-Fi access information by using the session key, to obtain the Wi-Fi access information, so that the mobile phone 600 can access the wireless router 500 based on the obtained SSID and access password when detecting the wireless router 500.

It may be understood that the mobile phone 100 may further send, to the mobile phone 600, SSIDs and access passwords corresponding to all wireless access points, personal hotspots, or routers connected to the mobile phone 100. For example, when the user carries the mobile phone 100 to the friend's house, the user manually enters the SSID and the access password of the wireless router 500 at the friend's house on the interactive interface of the mobile phone 100, and triggers the mobile phone 100 to connect to the wireless access point. After the user goes home, the mobile phone 100 exchanges the communication link information with the new mobile phone 600. The Wi-Fi access information used to access the wireless router 500 is sent to the new mobile phone 600. When the user carries the new mobile phone 600 and visits the friend's house again, because the mobile phone 600 synchronizes the Wi-Fi access information of all the connected wireless routers that is stored in the mobile phone 100, the new mobile phone 600 establishes the communication connection to the wireless router 500 based on the SSID and the access password of the wireless router 500 when detecting a wireless signal sent by the wireless router 500 at the friend's house. In this way, the new mobile phone 600 can be automatically connected to the wireless router 500 at the friend's home.

In this case, when the user does not enter the Wi-Fi access password, the mobile phone 600 may still be automatically connected to the wireless router, the wireless access point, or the personal hotspot that has been connected to the mobile phone 100 before.

In another application scenario, when the mobile phone 100 obtains the NFC access control identification information, for example, when the mobile phone 100 obtains an NFC door opening permission and an NFC video permission of an access control card, the mobile phone 100 establishes the secure transmission channel used to perform data exchange with the mobile phone 600, encrypts the NFC door opening permission information or the NFC video permission information by using the session key, and sends encrypted NFC door opening permission information or NFC video permission information to the mobile phone 600 through the secure transmission channel between the mobile phone 100 and the mobile phone 600 by using the negotiated communications protocol. In this way, when receiving the encrypted NFC door opening permission information or NFC video permission information, the mobile phone 600 decrypts the encrypted NFC door opening permission information or NFC video permission information by using the session key, to obtain the NFC door opening permission information or the NFC video permission information, so that the mobile phone 600 can be used as an NFC access control card. When the user needs to open the door by using the mobile phone 600, the user may move the mobile phone 600 close to an NFC access control sensor, so that the mobile phone 600 releases access control based on the obtained NFC door opening permission information or NFC video permission information.

In this case, the user does not need to manually perform NFC access control authorization on the mobile phone 600, and the mobile phone 600 may still be used as an access control card.

In the foregoing solution, for the terminal devices under the same user account, after establishing the communication connection to the second terminal device, when the first terminal device discovers the third terminal device at a short distance, the first terminal device may establish the communication connection to the third terminal device by using the near field communication technology even if the third terminal device is in the network disconnection state, so as to synchronize the communication link information to the third terminal device. Without user participation, the third terminal device may establish the communication connection to the second terminal device by using the communication link information shared by the first terminal device. In this manner, the operation steps of establishing communication connections among at least three terminal devices can be simplified, thereby reducing user operations, and further improving efficiency of establishing the communication connections among the at least three terminal devices.

Because the first terminal device and the third terminal device exchange information through NFC, the first terminal device and the third terminal device may share the file in the offline state, so that the user can implement data sharing between terminals when no network is available.

The communication link information is encrypted by using the session key, so that security of to-be-shared data in a transmission process can be improved. Even if another untrusted device receives the encrypted communication link information, the communication link information cannot be directly obtained. In this way, another untrusted device is prevented from being connected to the second terminal device by using the communication link information, to further protect security of data in the second terminal device.

It should be understood that sequence numbers of the steps do not mean an execution sequence in the foregoing embodiments. The execution sequence of the processes should be determined based on functions and internal logic of the processes, and should not constitute any limitation on the implementation processes of the embodiments of this application.

Figure 11:
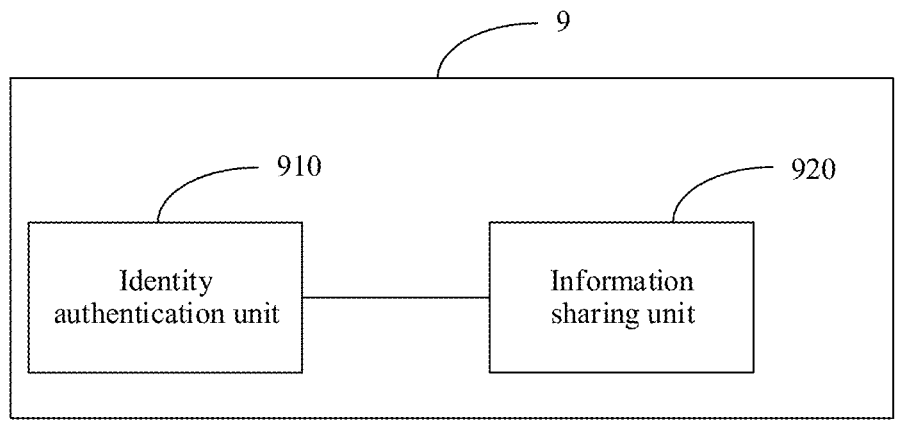
FIG. 11 is a schematic diagram of a structure of an information sharing apparatus according to an embodiment of this application.

Corresponding to the information sharing method in the foregoing embodiments, FIG. 11 is a schematic block diagram of a structure of an information sharing apparatus according to an embodiment of this application. For ease of description, only a part related to the embodiments of this application is shown. An information sharing apparatus 9 includes an identity authentication unit 910 and an information sharing unit 920.

The identity authentication unit 910 is configured to: after a first terminal device establishes a communication connection to a second terminal device, when the first terminal device approaches a third terminal device, perform identity authentication on the third terminal device through near field communication (NFC). The identity authentication unit 910 sends an identity authentication result to the information sharing unit 920.

The identity authentication unit 910 is configured to perform S101 in the embodiment corresponding to FIG. 6. For a specific implementation process, refer to the specific description of S101. Details are not described herein again.

The information sharing unit 920 is configured to: receive the identity authentication result sent by the identity authentication unit 910, and send communication link information to the third terminal device by using a short-range wireless communication technology when determining that an identity of the third terminal device is valid, to trigger the third terminal device to establish a communication connection to the second terminal device by using the communication link information when detecting the second terminal device.

The information sharing unit 920 is configured to perform S102 in the embodiment corresponding to FIG. 6. For a specific implementation process, refer to the specific description of S102. Details are not described herein again.

Optionally, the short-range wireless communication technology may be NFC, Bluetooth communication, or wireless fidelity (Wi-Fi).

Further, both a cellular mobile network and a wireless local area network of the third terminal device are in a disabled state, and the short-range wireless communication technology is NFC or Bluetooth communication.

Both the cellular mobile network and the wireless local area network of the third terminal device being in the disabled state means that the third terminal device does not enable the cellular mobile network and the wireless local area network, or currently cannot access the Internet through the cellular mobile network or the wireless local area network. Further, the second terminal device is a terminal device that completes pairing with the first terminal device in advance, and the communication link information sent by the information sharing unit 920 includes Bluetooth pairing information used for pairing with the second terminal device, so that after receiving the Bluetooth pairing information, the third terminal device performs pairing with the second terminal device by using the received Bluetooth pairing information when detecting the second terminal device.

Further, the communication link information sent by the information sharing unit 920 includes access information of a wireless network and/or NFC access control identification information.

The access information of the wireless network is used to connect to a router, an access point, or a personal hotspot. The access information may be an SSID and an access password. In this case, when entering a signal coverage area of a wireless network corresponding to any SSID, the third terminal may access, by using access information of a wireless network, the wireless network currently accessed by the first terminal device or the wireless network previously accessed by the first terminal device.

The NFC access control identification information is used to identify authorization information, for example, NFC access control authorization information. In this case, the third terminal device may be used as an NFC access control card to communicate with the second terminal device, to implement functions such as opening a door.

Figure 12:
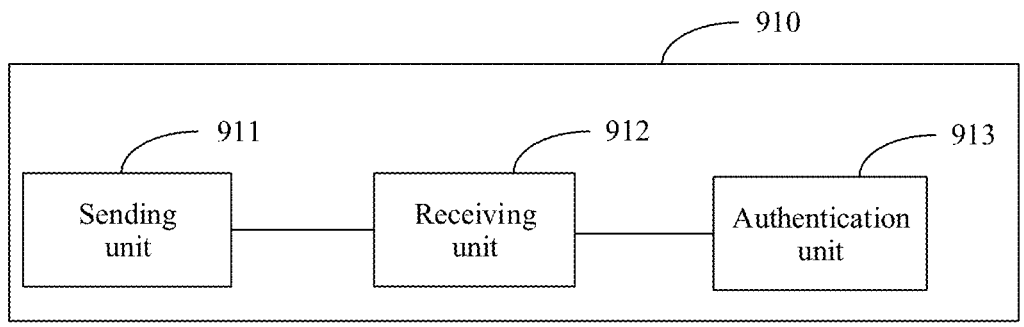
FIG. 12 is a schematic diagram of a structure of an identity authentication unit according to an embodiment of this application.

Optionally, FIG. 12 is a schematic diagram of a structure of the identity authentication unit according to an embodiment of this application. The identity authentication unit 910 includes:

a sending unit 911, configured to: when the first terminal device approaches the third terminal device, send an identity authentication notification message to the third terminal device through NFC, where the sending unit 911 sends a notification message to a receiving unit 912, to indicate the receiving unit 912 to receive first identity information returned by the third terminal device;

the receiving unit 912, configured to: receive the notification message sent by the sending unit 911, and obtain the first identity information returned by the third terminal device through NFC when the third terminal device receives the identity authentication notification message, where the receiving unit 912 sends the first identity information to an authentication unit 913; and the authentication unit 913, configured to: receive the first identity information sent by the receiving unit 912, and perform identity authentication on the third terminal device based on the first identity information and pre-stored second identity information.

Further, the first identity information includes a first device identifier and a first public key of the third terminal device.

The authentication unit 913 is configured to: obtain, from an identity database based on the first device identifier, a pre-stored public key corresponding to the third terminal device; perform identity authentication on the third terminal device based on the first public key and the pre-stored public key; and when the first public key is the same as the pre-stored public key, determine that the identity of the third terminal device is valid.

Further, the first identity information includes a first device identifier of the third terminal device, a first version number of a public key attribute credential of the third terminal device, and a first random number generated by the third terminal device.

Figure 13:
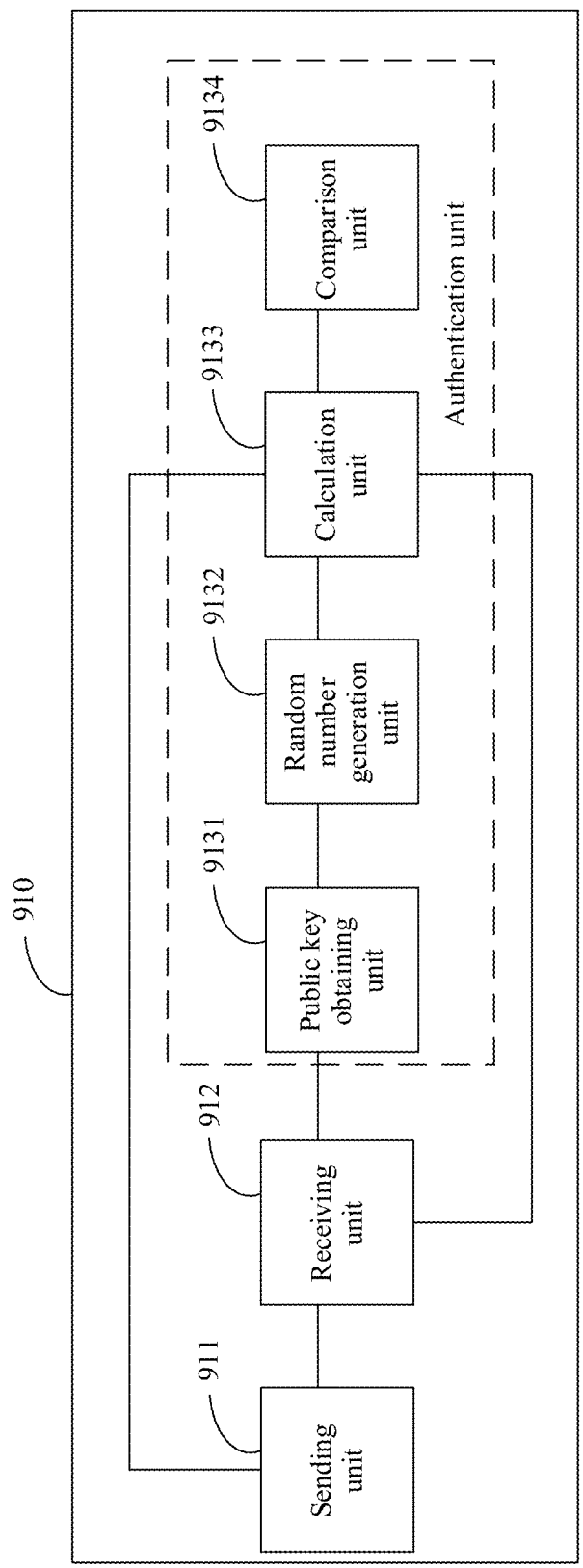
FIG. 13 is a schematic diagram of a structure of an identity authentication unit according to another embodiment of this application.

FIG. 13 is a schematic diagram of a structure of the identity authentication unit according to another embodiment of this application. The authentication unit 913 may include:
a public key obtaining unit 9131, configured to: receive the first identity information sent by a receiving unit 912, and obtain a first public key of the third terminal device based on the first device identifier and the first version number in the first identity information, where the public key obtaining unit 9131 sends the first public key to a random number generation unit 9132;
the random number generation unit 9132, configured to: receive the first public key sent by the public key obtaining unit 9131, calculate a first shared key based on a private key of the first terminal device and the first public key, and generate a second random number, where the random number generation unit 9132 sends the first shared key, a second device identifier of the first terminal device, the first random number, and the second random number to a calculation unit 9133; and
the calculation unit 9133, configured to: receive data sent by the random number generation unit 9132, and calculate a first identity feature value based on the first shared key, the second device identifier of the first terminal device, the first random number, and the second random number, where the calculation unit 9133 sends the first identity feature value to a comparison unit 9134, and indicates the sending unit 911 to send the first identity feature value, the second device identifier of the first terminal device, a second version number of the public key attribute credential, and the second random number to the third terminal device.

The sending unit 911 is further configured to: receive the notification message sent by the sending unit 911, and send the first identity feature value, the second device identifier of the first terminal device, the second version number of the public key attribute credential, and the second random number to the third terminal device through near field communication. The sending unit 911 indicates the receiving unit to receive a second identity feature value sent by the third terminal device.

The receiving unit 912 is further configured to: receive the notification message sent by the sending unit 911, and receive the second identity feature value returned by the third terminal device. The second identity feature value is obtained through calculation by the third terminal device based on a second shared key, the second device identifier, the first random number, and the second random number when the third terminal device obtains the second shared key through calculation. The second shared key is obtained through calculation based on a private key of the third terminal device and a public key of the first terminal device. The receiving unit 912 sends the second identity feature value to the comparison unit 9134.

The authentication unit 913 further includes the comparison unit 9134, configured to: receive the first identity feature value sent by the calculation unit 9133 and the second identity feature value sent by the receiving unit 912; compare the first identity feature value with the second identity feature value; and when determining that the first identity feature value is the same as the second identity feature value, determine that the identity of the third terminal device is valid.

Further, the public key obtaining unit 9131 is configured to:
search the identity database for a device identifier that matches the first device identifier; and
when the matched device identifier is found, and the first version number is less than or equal to the pre-stored second version number of the public key attribute credential, obtain the public key of the third terminal device from the identity database, or
when the matched device identifier is not found, and the first version number is greater than the pre-stored second version number of the public key attribute credential, request to obtain the first public key from the third terminal device.

Further, the public key obtaining unit 9131 is further configured to: when the matched device identifier is not found, and the first version number is less than the pre-stored second version number of the public key attribute credential, determine that the identity of the third terminal device is invalid.

Further, the information sharing unit 920 is configured to:
generate a session key when determining that the identity of the third terminal device is valid, and send the session key to the third terminal device by using the short-range wireless communication technology; and
encrypt the communication link information by using the session key, and send encrypted data to the third terminal device by using the short-range wireless communication technology.

In this solution, the communication link information is encrypted by using the session key, so that security of to-be-shared data in a transmission process can be improved. Even if another untrusted device receives the encrypted communication link information, the communication link information cannot be directly obtained. In this way, another untrusted device is prevented from being connected to the second terminal device by using the communication link information, to further protect security of data in the second terminal device.

In this way, at least two terminal devices may share a file in an offline state, so that a user can implement data sharing between terminals when no network is available.

Figure 14:
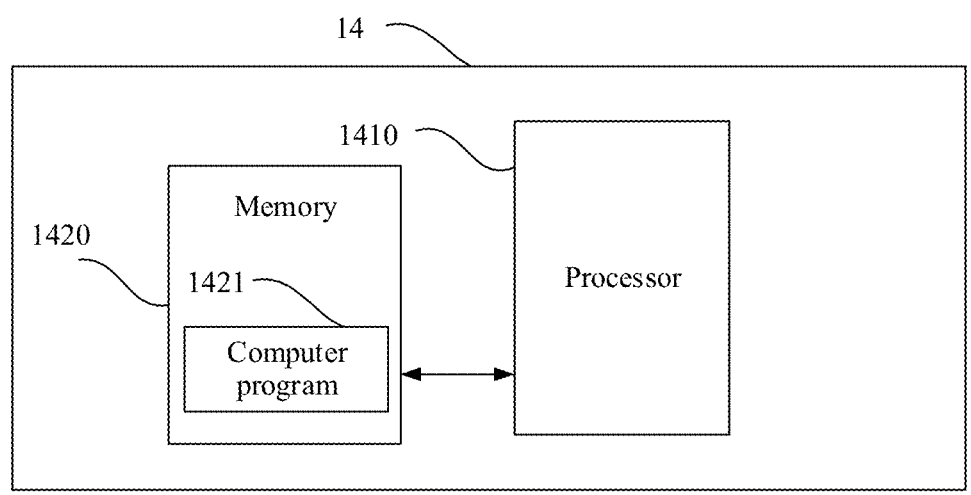
FIG. 14 is a schematic diagram of a structure of a terminal device according to an embodiment of this application.

FIG. 14 is a schematic diagram of a structure of a terminal device according to an embodiment of this application. As shown in FIG. 14, a terminal device 1414 includes at least one processor 1410 (only one processor is shown in FIG. 14), a memory 1420, and a computer program 1421 that is stored in the memory 1420 and that can be run on the at least one processor 1410. When executing the computer program 1421, the processor 1410 implements steps in any one of the foregoing information sharing method embodiments.

The terminal device 14 may be a wearable device, for example, a mobile phone, a notebook computer, or a smartwatch. The terminal device may include but is not limited to including the processor 1410 and the memory 1420. Persons skilled in the art may understand that FIG. 14 is merely an example of the terminal device 14, and does not constitute a limitation on the terminal device 14. The terminal device may include more or fewer components than those shown in the figure, or some components may be combined, or different components may be used. For example, the terminal device may further include an input/output device, a network access device, or the like.

The processor 1410 may be a central processing unit (CPU). The processor 1410 may alternatively be another general-purpose processor, a digital signal processor (DSP), an application-specific integrated circuit (ASIC), a field-programmable gate array (FPGA) or another programmable logic device, a discrete gate or transistor logic device, or a discrete hardware component. The general-purpose processor may be a microprocessor, or the processor may be any conventional processor or the like.

In some embodiments, the memory 1420 may be an internal storage unit of the terminal device 14, for example, a hard disk or memory of the terminal device 14. In some other embodiments, the memory 1420 may alternatively be an external storage device of the terminal device 14, for example, a smart media card (SMC), a secure digital (SD) card, or a flash card on the terminal device 14. Further, the memory 1420 may alternatively include both an internal storage unit and an external storage device of the terminal device 14. The memory 1420 is configured to store an operating system, an application, a boot loader (Boot Loader), data, another program, for example, program code of the computer program. The memory 1420 may further be configured to temporarily store data that has been output or is to be output.

In this embodiment of this application, the processor 1410 invokes the computer program 1421 stored in the memory to perform the following operations.

The processor 1410 is configured to: after a first terminal device establishes a communication connection to a second terminal device, when the first terminal device approaches a third terminal device, perform identity authentication on the third terminal device through near field communication (NFC); and send communication link information to the third terminal device by using a short-range wireless communication technology when determining that an identity of the third terminal device is valid, to trigger the third terminal device to establish a communication connection to the second terminal device by using the communication link information when detecting the second terminal device.

Optionally, both a cellular mobile network and a wireless local area network of the third terminal device are in a disabled state, and the short-range wireless communication technology is NFC or Bluetooth communication.

Optionally, the second terminal device is a terminal device that completes pairing with the first terminal device in advance, and the communication link information includes Bluetooth pairing information used for pairing with the second terminal device.

Optionally, the communication link information includes access information of a wireless network and/or NFC access control identification information.

Optionally, the processor 1410 is configured to:
send an identity authentication notification message to the third terminal device through NFC when approaching the third terminal device;
obtain first identity information returned by the third terminal device through NFC when the third terminal device receives the identity authentication notification message; and
perform identity authentication on the third terminal device based on the first identity information and pre-stored second identity information.

Further, the first identity information includes a first device identifier and a first public key of the third terminal device.

The processor 1410 is configured to: obtain, from an identity database based on the first device identifier, a pre-stored public key corresponding to the third terminal device; perform identity authentication on the third terminal device based on the first public key and the pre-stored public key; and when the first public key is the same as the pre-stored public key, determine that the identity of the third terminal device is valid.

Further, the first identity information includes a first device identifier of the third terminal device, a first version number of a public key attribute credential of the third terminal device, and a first random number generated by the third terminal device.

The processor 1410 is configured to:
obtain a first public key of the third terminal device based on the first device identifier and the first version number;
calculate a first shared key based on a private key of the first terminal device and the first public key, and generate a second random number;
calculate a first identity feature value based on the first shared key, a second device identifier of the first terminal device, the first random number, and the second random number;
control an antenna to send the first identity feature value, the second device identifier of the first terminal device, a second version number of the public key attribute credential, and the second random number to the third terminal device through near field communication;
obtain a second identity feature value that is received by the antenna and that is returned by the third terminal device, where the second identity feature value is obtained through calculation by the third terminal device based on a second shared key, the second device identifier, the first random number, and the second random number when the third terminal device obtains the second shared key through calculation; and the second shared key is obtained through calculation based on a private key of the third terminal device and a public key of the first terminal device; and
when determining that the first identity feature value is the same as the second identity feature value, determine that the identity of the third terminal device is valid.

Further, the processor 1410 is configured to include:
search the identity database for a device identifier that matches the first device identifier; and
when the matched device identifier is found, and the first version number is less than or equal to the pre-stored second version number of the public key attribute credential, obtain the public key of the third terminal device from the identity database, or
when the matched device identifier is not found, and the first version number is greater than the pre-stored second version number of the public key attribute credential, request to obtain the first public key from the third terminal device.

Further, after searching the identity database for the device identifier that matches the first device identifier, the processor 1410 is configured to: when the matched device identifier is not found, and the first version number is less than the pre-stored second version number of the public key attribute credential, determine that the identity of the third terminal device is invalid.

Further, the processor 1410 is configured to include:

generate a session key when determining that the identity of the third terminal device is valid, and send the session key to the third terminal device by using the short-range wireless communication technology; and encrypt the communication link information by using the session key, and control the antenna to send encrypted data to the third terminal device by using the short-range wireless communication technology.

It may be clearly understood by a person skilled in the art that, for convenient and brief description, division of the foregoing function units and modules is merely used as an example for illustration. In actual application, the foregoing functions can be allocated to different function units and modules and implemented based on a requirement, that is, an inner structure of the apparatus is divided into different function units and modules to implement all or some of the functions described above. Function units and modules in the embodiments may be integrated into one processing unit, or each of the units may exist alone physically, or two or more units may be integrated into one unit. The integrated unit may be implemented in a form of hardware, or may be implemented in a form of a software function unit. In addition, specific names of the function units and modules are merely used to distinguish each other, and are not intended to limit the protection scope of this application. For a specific working process of the units and modules in the foregoing system, refer to a corresponding process in the foregoing method embodiments. Details are not described herein again.

In the foregoing embodiments, the description of each embodiment has respective focuses. For a part that is not described in detail or recorded in an embodiment, refer to related descriptions in other embodiments.

A person of ordinary skill in the art may be aware that, in combination with the examples described in the embodiments disclosed in this specification, units and algorithm steps can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

In the embodiments provided in this application, it should be understood that the disclosed apparatuses and methods may be implemented in other manners. For example, the described system embodiment is merely an example. For example, division into the modules or units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, and may be located at one location, or may be distributed on a plurality of network units. Some or all of the units may be selected depending on actual requirements to achieve the objectives of the solutions in the embodiments.

In addition, function units in the embodiments of this application may be integrated into one processing unit, or each of the units may exist alone physically, or two or more units may be integrated into one unit. The integrated unit may be implemented in a form of hardware, or may be implemented in a form of a software function unit.

When the integrated unit is implemented in the form of the software function unit and sold or used as an independent product, the integrated unit may be stored in a computer-readable storage medium. Based on such an understanding, in this application, all or some of the procedures of the methods in the foregoing embodiments may be implemented by a computer program instructing related hardware. The computer program may be stored in a computer-readable storage medium. When the computer program is executed by a processor, the steps in the foregoing method embodiments can be implemented. The computer program includes computer program code, and the computer program code may be in a source code form, an object code form, an executable file form, some intermediate forms, or the like. The computer-readable medium may include at least any entity or apparatus that can carry the computer program code to the terminal device 14, a recording medium, a computer memory, a read-only memory (ROM), a random access memory (RAM), an electrical carrier signal, a telecommunication signal, and a software distribution medium, for example, a USB flash drive, a removable hard disk, a magnetic disk, or an optical disk. In some jurisdictions, according to legislation and patent practice, the computer-readable medium cannot be an electrical carrier signal or a telecommunications signal.

The foregoing embodiments are merely intended to describe the technical solutions of this application, but not to limit this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. An information sharing method, comprising:
  establishing, by a first terminal device, a communication connection to a second terminal device;
  sending, by the first terminal device, an identity authentication notification message to a third terminal device through near field communication (NFC) when approaching the third terminal device;
  obtaining, by the first terminal device, first identity information returned by the third terminal device through NFC when the third terminal device receives the identity authentication notification message;
  performing, by the first terminal device, identity authentication on a third terminal device through when detecting the third terminal device;

determining, by the first terminal device, whether to send communication link information to the third terminal device based on the performed identity authentication; and sending, by the first terminal device, the communication link information to the third terminal device by using a short-range wireless communication technology when determining that an identity of the third terminal device is valid, wherein the communication link information is used to establish a communication connection between the third terminal device and the second terminal device;

wherein the first identity information comprises a first device identifier of the third terminal device, a first version number of a public key attribute credential of the third terminal device, and a first random number generated by the third terminal device, and wherein the performing, by the first terminal device, identity authentication on the third terminal device based on the first identity information and pre-stored second identity information comprises:

obtaining, by the first terminal device, a first public key of the third terminal device based on the first device identifier and the first version number;

calculating, by the first terminal device, a first shared key based on a private key of the first terminal device and the first public key, and generating a second random number;

calculating, by the first terminal device, a first identity feature value based on the first shared key, a second device identifier of the first terminal device, the first random number, and the second random number;

sending, by the first terminal device, the first identity feature value, the second device identifier of the first terminal device, a second version number of the public key attribute credential, and the second random number to the third terminal device through near field communication;

receiving, by the first terminal device, a second identity feature value returned by the third terminal device, wherein the second identity feature value is obtained through calculation by the third terminal device based on a second shared key, the second device identifier, the first random number, and the second random number when the third terminal device obtains the second shared key through calculation; and the second shared key is obtained through calculation based on a private key of the third terminal device and a public key of the first terminal device; and when the first identity feature value is the same as the second identity feature value, determining, by the first terminal device, that the identity of the third terminal device is valid.

2. The information sharing method according to claim 1, wherein both a cellular mobile network and a wireless local area network of the third terminal device are in a disabled state.

3. The information sharing method according to claim 1, wherein the short-range wireless communication technology is NFC.

4. The information sharing method according to claim 1, wherein the short-range wireless communication technology is Bluetooth communication.

5. The information sharing method according to claim 1, wherein the second terminal device is a terminal device that completes pairing with the first terminal device in advance, and the communication link information comprises Bluetooth pairing information used for pairing with the second terminal device.

6. The information sharing method according to claim 1, wherein the communication link information comprises access information of a wireless network.

7. The information sharing method according to claim 6, wherein the communication link information further comprises NFC access control identification information.

8. The information sharing method according to claim 1, wherein the communication link information comprises NFC access control identification information.

9. The information sharing method according to claim 1, wherein the first identity information comprises a first device identifier and a first public key of the third terminal device; and the performing, by the first terminal device, identity authentication on the third terminal device based on the first identity information and pre-stored second identity information comprises:

obtaining, by the first terminal device from an identity database based on the first device identifier, a pre-stored public key corresponding to the third terminal device; performing identity authentication on the third terminal device based on the first public key and the pre-stored public key; and when the first public key is the same as the pre-stored public key, determining that the identity of the third terminal device is valid.

10. The information sharing method according to claim 1, wherein the obtaining, by the first terminal device, a first public key of the third terminal device based on the first device identifier and the first version number comprises:

searching, by the first terminal device, an identity database for a device identifier that matches the first device identifier; and when the matched device identifier is found and the first version number is less than or equal to the pre-stored second version number of the public key attribute credential, obtaining the public key of the third terminal device from the identity database, or when the matched device identifier is not found and the first version number is greater than the pre-stored second version number of the public key attribute credential, requesting to obtain the first public key from the third terminal device.

11. The information sharing method according to claim 10, wherein after the searching, by the first terminal device, an identity database for a device identifier that matches the first device identifier, the method further comprises:

when the matched device identifier is not found and the first version number is less than the pre-stored second version number of the public key attribute credential, determining that the identity of the third terminal device is invalid.

12. The information sharing method according to claim 1, wherein the sending, by the first terminal device, communication link information to the third terminal device by using a short-range wireless communication technology when determining that an identity of the third terminal device is valid comprises:

generating, by the first terminal device, a session key when determining that the identity of the third terminal device is valid, and sending the session key to the third terminal device by using the short-range wireless communication technology; and encrypting, by the first terminal device, the communication link information by using the session key, and sending encrypted data to the third terminal device by using the short-range wireless communication technology.

13. A first terminal device, comprising:
a processor; and
a storage medium containing computer-executable instructions;
wherein the processor is configured to execute the computer-executable instructions to enable the terminal device to perform operations comprising:
establishing a communication connection to a second terminal device;
sending, by the first terminal device, an identity authentication notification message to a third terminal device through near field communication (NFC) when approaching the third terminal device;
obtaining, by the first terminal device, first identity information returned by the third terminal device through NFC when the third terminal device receives the identity authentication notification message;
performing identity authentication on a third terminal device through NFC when detecting the third terminal device;
determining, by the terminal device, whether to send communication link information to the third terminal device based on the performed identity authentication; and
sending the communication link information to the third terminal device by using a short-range wireless communication technology when determining that an identity of the third terminal device is valid, wherein the communication link information is used to establish a communication connection between the third terminal device and the second terminal device;
wherein the first identity information comprises a first device identifier of the third terminal device, a first version number of a public key attribute credential of the third terminal device, and a first random number generated by the third terminal device, and wherein the performing, by the first terminal device, identity authentication on the third terminal device based on the first identity information and pre-stored second identity information comprises:
obtaining, by the first terminal device, a first public key of the third terminal device based on the first device identifier and the first version number;
calculating, by the first terminal device, a first shared key based on a private key of the first terminal device and the first public key, and generating a second random number;
calculating, by the first terminal device, a first identity feature value based on the first shared key, a second device identifier of the first terminal device, the first random number, and the second random number;
sending, by the first terminal device, the first identity feature value, the second device identifier of the first terminal device, a second version number of the public key attribute credential, and the second random number to the third terminal device through near field communication;
receiving, by the first terminal device, a second identity feature value returned by the third terminal device, wherein the second identity feature value is obtained through calculation by the third terminal device based on a second shared key, the second device identifier, the first random number, and the second random number when the third terminal device obtains the second shared key through calculation; and the second shared key is obtained through calculation based on a private key of the third terminal device and a public key of the first terminal device; and
when the first identity feature value is the same as the second identity feature value, determining, by the first terminal device, that the identity of the third terminal device is valid.

14. The first terminal device according to claim 13, wherein both a cellular mobile network and a wireless local area network of the third terminal device are in a disabled state.

15. The first terminal device according to claim 13, wherein the short-range wireless communication technology is NFC.

16. The first terminal device according to claim 13, wherein the short-range wireless communication technology is Bluetooth communication.

17. The first terminal device according to claim 13, wherein the second terminal device is a terminal device that completes pairing with the terminal device in advance, and the communication link information comprises Bluetooth pairing information used for pairing with the second terminal device.

18. A non-transitory computer-readable storage medium, wherein the computer-readable storage medium stores a computer program, and the computer program, when executed by a processor, enables a first terminal device to perform operations comprising:
establishing a communication connection to a second terminal device;
sending, by the first terminal device, an identity authentication notification message to a third terminal device through near field communication (NFC) when approaching the third terminal device;
obtaining, by the first terminal device, first identity information returned by the third terminal device through NFC when the third terminal device receives the identity authentication notification message;
performing identity authentication on a third terminal device through NFC when detecting the third terminal device;
determining, by the first terminal device, whether to send communication link information to the third terminal device based on the performed identity authentication; and
sending the communication link information to the third terminal device by using a short-range wireless communication technology when determining that an identity of the third terminal device is valid, wherein the communication link information is used to establish a communication connection between the third terminal device and the second terminal device;
wherein the first identity information comprises a first device identifier of the third terminal device, a first version number of a public key attribute credential of the third terminal device, and a first random number generated by the third terminal device, and wherein the performing, by the first terminal device, identity authentication on the third terminal device based on the first identity information and pre-stored second identity information comprises:
obtaining, by the first terminal device, a first public key of the third terminal device based on the first device identifier and the first version number;

calculating, by the first terminal device, a first shared key based on a private key of the first terminal device and the first public key, and generating a second random number;

calculating, by the first terminal device, a first identity feature value based on the first shared key, a second device identifier of the first terminal device, the first random number, and the second random number;

sending, by the first terminal device, the first identity feature value, the second device identifier of the first terminal device, a second version number of the public key attribute credential, and the second random number to the third terminal device through near field communication;

receiving, by the first terminal device, a second identity feature value returned by the third terminal device, wherein the second identity feature value is obtained through calculation by the third terminal device based on a second shared key, the second device identifier, the first random number, and the second random number when the third terminal device obtains the second shared key through calculation; and the second shared key is obtained through calculation based on a private key of the third terminal device and a public key of the first terminal device; and when the first identity feature value is the same as the second identity feature value, determining, by the first terminal device, that the identity of the third terminal device is valid.

* * * * *

UNITED STATES PATENT AND TRADEMARK OFFICE
CERTIFICATE OF CORRECTION

PATENT NO. : 12,010,519 B2
APPLICATION NO. : 17/665779
DATED : June 11, 2024
INVENTOR(S) : Fusheng Li et al.

It is certified that error appears in the above-identified patent and that said Letters Patent is hereby corrected as shown below:

In the Claims

In Column 44, Line 66, in Claim 1, after "through" insert -- NFC --.

Signed and Sealed this
Thirteenth Day of August, 2024

Katherine Kelly Vidal
Director of the United States Patent and Trademark Office